(12) United States Patent
Zhang et al.

(10) Patent No.: US 11,490,426 B2
(45) Date of Patent: Nov. 1, 2022

(54) TWO-ROOT PREAMBLE DESIGN FOR DELAY AND FREQUENCY SHIFT

(71) Applicant: QUALCOMM Incorporated, San Diego, CA (US)

(72) Inventors: Dan Zhang, San Diego, CA (US); Xiao Feng Wang, San Diego, CA (US); Peter Gaal, San Diego, CA (US); Jun Ma, San Diego, CA (US); Qiang Wu, San Diego, CA (US); Iyab Issam Sakhnini, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/992,678

(22) Filed: Aug. 13, 2020

(65) Prior Publication Data

US 2021/0051730 A1    Feb. 18, 2021

Related U.S. Application Data

(60) Provisional application No. 62/888,307, filed on Aug. 16, 2019.

(51) Int. Cl.
*H04W 74/08* (2009.01)
*H04L 27/00* (2006.01)
*H04L 5/00* (2006.01)

(52) U.S. Cl.
CPC ......... *H04W 74/0833* (2013.01); *H04L 5/005* (2013.01); *H04L 27/0014* (2013.01); *H04L 2027/0095* (2013.01)

(58) Field of Classification Search
CPC ......... H04W 74/0833; H04W 74/0858; H04W 74/08; H04W 74/0866; H04L 27/0014; H04L 27/0012; H04L 27/2657; H04L 5/005; H04L 5/0051; H04L 2027/0095; H04L 2027/0093; H04L 2027/0083
See application file for complete search history.

(56) References Cited

U.S. PATENT DOCUMENTS

| | | | |
|---|---|---|---|
| 2007/0230600 A1* | 10/2007 | Bertrand | H04W 74/0833 375/260 |
| 2011/0188466 A1* | 8/2011 | Zhang | H04W 24/10 370/330 |

(Continued)

FOREIGN PATENT DOCUMENTS

WO    WO-2009047732 A2    4/2009

OTHER PUBLICATIONS

Huang S., et al., "Improved Preamble Detection and Round-Trip Delay Estimation for Random Access in High-Mobility Airborne Communication Systems," 2019 IEEE/CIC International Conference on Communications in China (ICCC), IEEE, Aug. 11, 2019 (Aug. 11, 2019), pp. 384-388, XP033623085, DOI: 10.1109/ICCCHINA.2019.8855820 [retrieved on Oct. 2, 2019] Section III.

(Continued)

*Primary Examiner* — Phong La
(74) *Attorney, Agent, or Firm* — Holland & Hart LLP

(57) ABSTRACT

Methods, systems, and devices for wireless communications are described. A user equipment (UE) may communicate with a base station by initiating a random access procedure with a two-root preamble. The UE may receive, from the base station, control signaling that indicates a set of root preamble sequences. The UE may transmit, to the base station, a preamble signal that is generated based on a first root preamble sequence and a second root preamble sequence of the set of root preamble sequences. The UE may then monitor for a preamble response based on the preamble signal. In some cases, the base station may be a base station in a terrestrial network. In other cases, the base station may be a satellite in a non-terrestrial network (NTN).

30 Claims, 17 Drawing Sheets

(56) References Cited

U.S. PATENT DOCUMENTS

| | | | | |
|---|---|---|---|---|
| 2017/0094686 | A1* | 3/2017 | Ramamurthi | H04L 27/2633 |
| 2017/0223744 | A1* | 8/2017 | Qian | H04W 16/28 |
| 2018/0220466 | A1* | 8/2018 | Park | H04W 74/0833 |
| 2019/0150190 | A1* | 5/2019 | Kim | H04W 56/00 370/329 |
| 2019/0158337 | A1* | 5/2019 | Yoon | H04L 27/2666 |
| 2019/0274172 | A1* | 9/2019 | Yoon | H04W 72/044 |
| 2019/0281624 | A1* | 9/2019 | Kim | H04W 74/002 |
| 2019/0350000 | A1* | 11/2019 | Zhang | H04W 72/0406 |
| 2020/0036430 | A1* | 1/2020 | Kim | H04B 7/088 |
| 2020/0037360 | A1* | 1/2020 | Qian | H04W 16/28 |
| 2020/0396774 | A1* | 12/2020 | Thota | H04J 13/102 |
| 2021/0105820 | A1* | 4/2021 | Kim | H04B 7/0626 |
| 2021/0243814 | A1* | 8/2021 | Zhang | H04W 74/0833 |
| 2022/0007414 | A1* | 1/2022 | Kim | H04W 56/00 |
| 2022/0022263 | A1* | 1/2022 | Zhang | H04W 74/006 |

OTHER PUBLICATIONS

International Search Report and Written Opinion—PCT/US2020/046434—ISA/EPO—dated Nov. 9, 2020 (194014WO).

Qualcomm Incorporated: "Evaluations of 2-Rooted PRACH Preamble," 3GPP Draft, 3GPP TSG RAN WG1 #98bis, R1-1911113 Evaluations of 2-Rooted PRACH Preamble, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 5, 2019 (Oct. 5, 2019), XP051789889, 9 pages, Retrieved from the Internet: URL: http://www.3gpp.org/ftp/tsg_ran/WG1_RL1/TSGR1_98b/Docs/R1-1911113.zip [retrieved on Oct. 5, 2019] Section 2.; figure 1.

TCL Communication: "PRACH Design Considerations for Capacity Enhancement and Beam-sweeping," 3GPP Draft, 3GPP TSG RAN WG1 Meeting #89, R1-1709017, 3rd Generation Partnership Project (3GPP), Mobile Competence Centre, 650, Route Des Lucioles, F-06921, Sophia-Antipolis Cedex, France, vol. RAN WG1, No. Hangzhou, China; May 15, 2017-May 19, 2017, May 14, 2017 (May 14, 2017), XP051274179, 9 pages, Retrieved from the Internet: URL: http://www.3gpp.org/ftp/Meetings_3GPP_SYNC/RAN1/Docs/ [retrieved on May 14, 2017] figure 2 Section 2 PRACH Capacity Enhancements Section 2.1 Proposed PRACH design to resolve TA ambiguity in option 1 Section 2.2 Outline of a PRACH receiver for proposed option 1b.

Zhang C., et al., "Random Access Preamble Design for Large Frequency Shift in Satellite Communication," 2019 IEEE 2nd 5G World Forum (5GWF), IEEE, Sep. 30, 2019 (Sep. 30, 2019), pp. 659-664, XP033665212, DOI: 10.1109/5GWF.2019.8911614 [retrieved on Nov. 25, 2019] Section IV.

\* cited by examiner

TWO-ROOT PREAMBLE DESIGN FOR DELAY AND FREQUENCY SHIFT

CROSS REFERENCE

The present Application for Patent claims the benefit of U.S. Provisional Patent Application No. 62/888,307 by Zhang et al., entitled "TWO-ROOT PREAMBLE DESIGN FOR DELAY AND FREQUENCY SHIFT," filed Aug. 16, 2019, assigned to the assignee hereof, and expressly incorporated by reference in its entirety herein.

BACKGROUND

The following relates generally to wireless communications, and more specifically to two-root preamble design for delay and frequency shift.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A random access procedure between a UE and a base station may be initiated by the transmission of a random access channel (RACH) preamble by a UE to the base station. In some cases, the UE and the base station may be a part of a non-terrestrial network (NTN). In these cases, there may be a large distance between the UE and the base station (e.g., a satellite). Because of the distance, there may be a long round-trip delay (RTD) and frequency shift in message transmissions between the UE and the base station due to the Doppler shift effect.

SUMMARY

The described techniques relate to improved methods, systems, devices, and apparatuses that support two-root preamble design for delay and frequency shift. Generally, the described techniques provide for improved communications in a non-terrestrial network (NTN), including detecting the round-trip delay (RTD) and frequency shift associated with distances and relative velocities in an NTN. The described techniques provide for a two-root preamble design that is generated by a user equipment (UE) and transmitted to a satellite or base station as a part of a random access process. The two-root preamble may enable detection by the satellite of the RTD and Doppler shift. The satellite may then transmit an indication of the RTD and Doppler shift to the UE, and the UE may, in some examples, pre-compensate future transmissions based on the RTD and Doppler shift indication.

A method of wireless communications by a UE is described. The method may include receiving control signaling that indicates a set of root preamble sequences, transmitting a preamble signal that is generated based on a first root preamble sequence and a second root preamble sequence of the set of root preamble sequences, and monitoring for a preamble response based on the preamble signal.

An apparatus for wireless communications by a UE is described. The apparatus may include a processor, memory coupled with the processor, and instructions stored in the memory. The instructions may be executable by the processor to cause the apparatus to receive control signaling that indicates a set of root preamble sequences, transmit a preamble signal that is generated based on a first root preamble sequence and a second root preamble sequence of the set of root preamble sequences, and monitor for a preamble response based on the preamble signal.

Another apparatus for wireless communications by a UE is described. The apparatus may include means for receiving control signaling that indicates a set of root preamble sequences, transmitting a preamble signal that is generated based on a first root preamble sequence and a second root preamble sequence of the set of root preamble sequences, and monitoring for a preamble response based on the preamble signal.

A non-transitory computer-readable medium storing code for wireless communications by a UE is described. The code may include instructions executable by a processor to receive control signaling that indicates a set of root preamble sequences, transmit a preamble signal that is generated based on a first root preamble sequence and a second root preamble sequence of the set of root preamble sequences, and monitor for a preamble response based on the preamble signal.

In some examples of the method, apparatuses, and non-transitory computer-readable medium described herein, transmitting the preamble signal may include operations, features, means, or instructions for transmitting the preamble signal over two symbol periods that may be sequential in time.

In some examples of the method, apparatuses, and non-transitory computer-readable medium described herein, transmitting the preamble signal may include operations, features, means, or instructions for transmitting a first preamble signal that generated based on the first root preamble sequence during a first symbol period, and transmitting a second preamble signal that generated based on the second root preamble sequence during a second symbol period that may be sequential in time to the first symbol period.

In some examples of the method, apparatuses, and non-transitory computer-readable medium described herein, monitoring for the preamble response may include operations, features, means, or instructions for transmitting a second preamble signal based on determining that the preamble response may have not been received.

In some examples of the method, apparatuses, and non-transitory computer-readable medium described herein, monitoring for the preamble response may include operations, features, means, or instructions for receiving the preamble response from a base station, and establishing connectivity with the base station based on the preamble response.

In some examples of the method, apparatuses, and non-transitory computer-readable medium described herein, transmitting the preamble signal may include operations, features, means, or instructions for transmitting the preamble signal that may be generated based on a first root preamble sequence pair that includes the first root preamble sequence and the second root preamble sequence.

Some examples of the method, apparatuses, and non-transitory computer-readable medium described herein may further include operations, features, means, or instructions for generating a set of preamble sequence pairs based on the set of root preamble sequences, where each first tuple of each preamble sequence pair of the set of preamble sequence pairs may be unique and each second tuple in each preamble sequence pair of the set of preamble sequence pairs may be unique.

Some examples of the method, apparatuses, and non-transitory computer-readable medium described herein may further include operations, features, means, or instructions for generating a set of preamble sequence pairs based on the set of root preamble sequences, where each first tuple of each preamble sequence pair of the set of preamble sequence pairs may be unique or each second tuple in each preamble sequence pair of the set of preamble sequence pairs may be unique.

Some examples of the method, apparatuses, and non-transitory computer-readable medium described herein may further include operations, features, means, or instructions for receiving a doppler indicator, a delay indicator, or both, based on the preamble signal, and transmitting a data transmission, a control transmission, or both, using a waveform that may be pre-compensated based on the doppler indicator, the delay indicator, or both.

Some examples of the method, apparatuses, and non-transitory computer-readable medium described herein may further include operations, features, means, or instructions for appending a first cyclic prefix to the first root preamble sequence and a second cyclic prefix to the second root preamble sequence to generate a combined root preamble sequence, where the preamble signal may be generated based on the combined preamble sequence.

Some examples of the method, apparatuses, and non-transitory computer-readable medium described herein may further include operations, features, means, or instructions for appending a first cyclic prefix to the first root preamble sequence to generate a first appended preamble sequence and a second cyclic prefix to the second root preamble sequence to generate a second appended preamble sequence.

In some examples of the method, apparatuses, and non-transitory computer-readable medium described herein, transmitting the preamble signal may include operations, features, means, or instructions for transmitting, in a first frequency resource, a first preamble signal that may be generated based on the first appended preamble sequence, and transmitting, in a second frequency resource, a second preamble signal that may be generated based on the second appended preamble sequence.

In some examples of the method, apparatuses, and non-transitory computer-readable medium described herein, the first and second preamble signals may be transmitted during a single symbol period.

In some examples of the method, apparatuses, and non-transitory computer-readable medium described herein, a guard time satisfies a round trip delay threshold.

In some examples of the method, apparatuses, and non-transitory computer-readable medium described herein, a length of each of the first root preamble sequence and of the second root preamble sequence satisfies a cyclic prefix length threshold.

In some examples of the method, apparatuses, and non-transitory computer-readable medium described herein, each of the first root preamble sequence and the second root preamble sequence may be a Zadoff-Chu sequence.

A method of wireless communications by a wireless device is described. The method may include transmitting control signaling that indicates a set of root preamble sequences, receiving a preamble signal that is generated based on a first root preamble sequence and a second root preamble sequence of the set of root preamble sequences, and transmitting a preamble response based on the preamble signal.

An apparatus for wireless communications by a wireless device is described. The apparatus may include a processor, memory coupled with the processor, and instructions stored in the memory. The instructions may be executable by the processor to cause the apparatus to transmit control signaling that indicates a set of root preamble sequences, receive a preamble signal that is generated based on a first root preamble sequence and a second root preamble sequence of the set of root preamble sequences, and transmit a preamble response based on the preamble signal.

Another apparatus for wireless communications by a wireless device is described. The apparatus may include means for transmitting control signaling that indicates a set of root preamble sequences, receiving a preamble signal that is generated based on a first root preamble sequence and a second root preamble sequence of the set of root preamble sequences, and transmitting a preamble response based on the preamble signal.

A non-transitory computer-readable medium storing code for wireless communications by a wireless device is described. The code may include instructions executable by a processor to transmit control signaling that indicates a set of root preamble sequences, receive a preamble signal that is generated based on a first root preamble sequence and a second root preamble sequence of the set of root preamble sequences, and transmit a preamble response based on the preamble signal.

In some examples of the method, apparatuses, and non-transitory computer-readable medium described herein, receiving the preamble signal may include operations, features, means, or instructions for receiving, via a transceiver, the preamble signal over two symbol periods that may be sequential in time.

In some examples of the method, apparatuses, and non-transitory computer-readable medium described herein, receiving the preamble signal may include operations, features, means, or instructions for receiving a first preamble signal that generated based on the first root preamble sequence during a first symbol period, and receiving a second preamble signal that generated based on the second root preamble sequence during a second symbol period that may be sequential in time to the first symbol period.

In some examples of the method, apparatuses, and non-transitory computer-readable medium described herein, receiving the first preamble signal may include operations, features, means, or instructions for performing a first correlation of a first signal received during the first symbol period with each of the set of root preamble sequences to identify the first root preamble sequence, performing a second correlation of a second signal received during the second symbol period with each of the set of root preamble sequences to identify the second root preamble sequence, and identifying a doppler shift, a delay, or both, based on the first correlation, the second correlation, or both.

Some examples of the method, apparatuses, and non-transitory computer-readable medium described herein may further include operations, features, means, or instructions for establishing connectivity with a user equipment based on the preamble response.

In some examples of the method, apparatuses, and non-transitory computer-readable medium described herein, receiving the preamble signal may include operations, features, means, or instructions for receiving the preamble signal that may be generated based on a first root preamble sequence pair that includes the first root preamble sequence and the second root preamble sequence.

Some examples of the method, apparatuses, and non-transitory computer-readable medium described herein may further include operations, features, means, or instructions for transmitting a doppler indicator, a delay indicator, or both, based on the preamble signal, and receiving a data transmission, a control transmission, or both, using a waveform that may be pre-compensated based on the doppler indicator, the delay indicator, or both.

Some examples of the method, apparatuses, and non-transitory computer-readable medium described herein may further include operations, features, means, or instructions for transmitting a doppler indicator, a delay indicator, or both, based on the preamble signal, and demodulating a data transmission, a control transmission, or both, based on the doppler indicator, the delay indicator, or both.

In some examples of the method, apparatuses, and non-transitory computer-readable medium described herein, receiving the preamble signal may include operations, features, means, or instructions for receiving, in a first frequency resource, a first preamble signal, and receiving, in a second frequency resource, a second preamble signal.

In some examples of the method, apparatuses, and non-transitory computer-readable medium described herein, the first and second preamble signals may be transmitted during a single symbol period.

In some examples of the method, apparatuses, and non-transitory computer-readable medium described herein, a guard time satisfies a round trip delay threshold.

In some examples of the method, apparatuses, and non-transitory computer-readable medium described herein, a length of each of the first root preamble sequence and of the second root preamble sequence satisfies a cyclic prefix length threshold.

In some examples of the method, apparatuses, and non-transitory computer-readable medium described herein, each of the first root preamble sequence and the second root preamble sequence may be a Zadoff-Chu sequence.

In some examples of the method, apparatuses, and non-transitory computer-readable medium described herein, the wireless device may be a terrestrial base station or a satellite.

DETAILED DESCRIPTION

Figure 1:
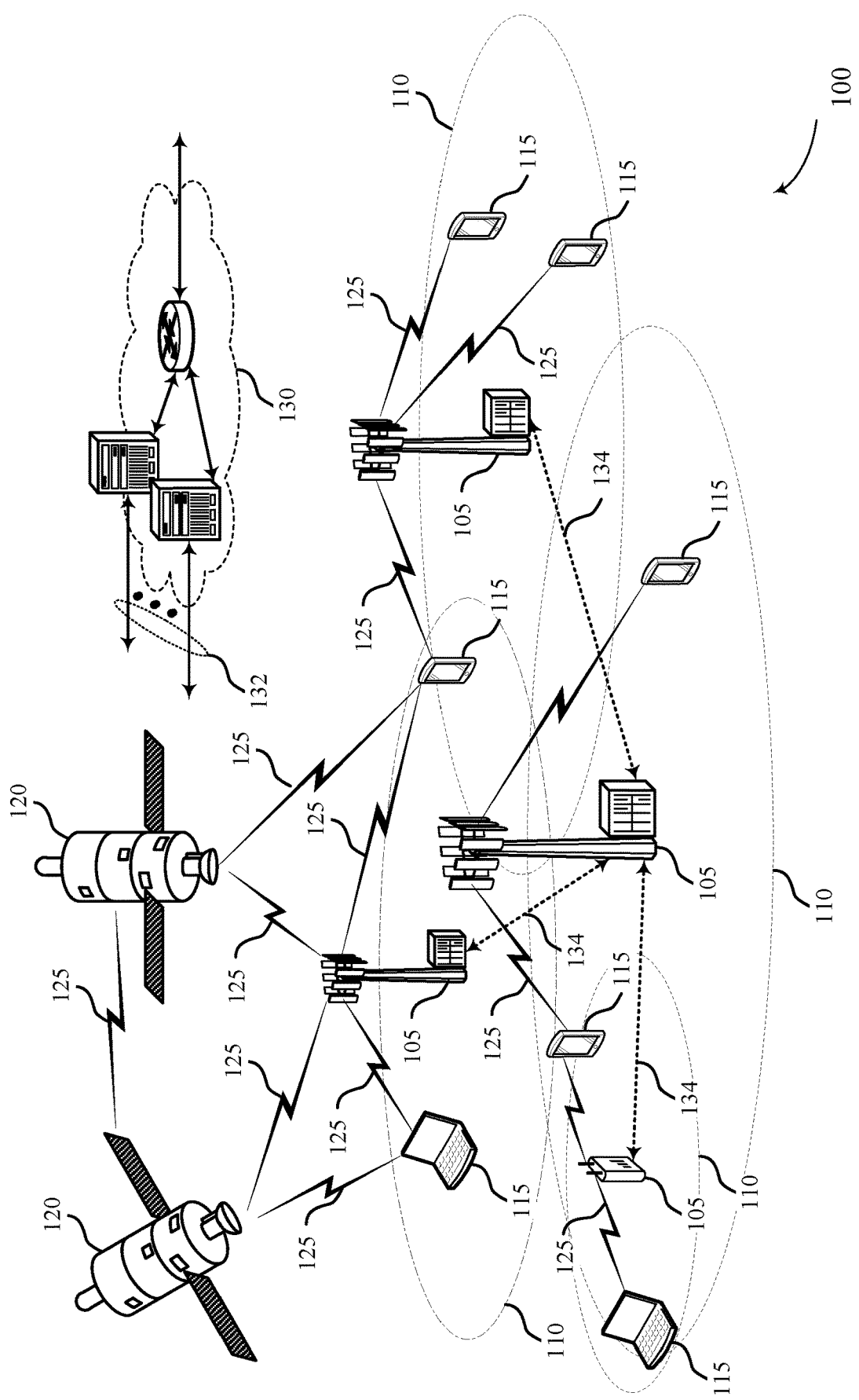
FIG. 1 illustrates an example of a system for wireless communications that supports two-root preamble design for delay and frequency shift in accordance with aspects of the present disclosure.

Non-terrestrial networks (NTNs) may be wireless communications systems involving the use of satellites to provide coverage for terrestrial base stations and user equipments (UEs). One or more satellites may be included in an NTN. Some satellites in an NTN may operate as base stations, and UEs may communicate directly with a serving satellite. In other cases, base stations or other satellites may relay transmissions between a serving satellite and a UE.

Satellites may refer to vehicles operating in a variety of earth orbits, and in particular distances from the surface of the earth. For example, satellites may function in low-earth orbit (LEO), medium earth orbit (MEO) geostationary earth orbit (GEO), geosynchronous orbit (GSO), highly elliptical orbits (HEO), or another type of orbit. Each type of orbit may be defined for ranges of distances away from the surface of the earth. The distance between a UE and a serving satellite may be much greater than typical distances between a UE and a base station in a terrestrial network.

The distance between the satellite and the UE may lead to a round-trip delay (RTD) and a frequency shift that may negatively impact efficiency and communications functionality between the UE and the satellite. The frequency shift in the communications frequency between the satellite and the UE may be caused by the Doppler shift and by local oscillator error. For example, a satellite may be 600 kilometers (km) from the earth's surface. The satellite may have a small cell diameter of 100 km, and may observe a frequency shift of up to 125 kilohertz (kHz).

A UE may determine to connect to a new cell or base station (such as a satellite) based on a variety of communication parameters, movement of the UE, or the initiation of a handover procedure. In order to initiate communication with a different cell, the UE may transmit a random access channel (RACH) preamble to begin the random access procedure of connecting to a new cell. The transmission of the preamble may occur in a physical random access channel (PRACH), and the preamble may be transmitted as part of a multiple step random access process.

The random access process of a UE connecting to a cell may include multiple steps. The UE may transmit a preamble message (e.g., PRACH Msg1) to a base station (e.g., a satellite). The base station may transmit a preamble response (e.g., PRACH response Msg2) based on the received preamble. Based on receiving the preamble response, the UE may transmit a radio resource control (RRC) connection request (e.g., Msg3) to the base station. The base station may respond with an RRC connection setup message (e.g., Msg4). Each of these messages may be transmitted back and forth between a UE and a base station. In a terrestrial network, the RTD may have a small impact on messaging delays, and the Doppler shift and frequency may also have a minor impact.

However, the RTD and frequency shift due to the long-distance aspects of an NTN in cases where the base station is an orbiting satellite may impede the transmission timing of random access procedure transmissions. This may impact and interfere with transmissions to and from the satellite and the UE for the random access process and of other messages transmitted after the UE is connected to the cell. Further, the frequency shift caused by the Doppler effect associated with an NTN may impact accurate message reception and may lead to inaccurately decoded messages and inefficient transmissions.

In some cases, the design of a preamble (e.g., an NR PRACH preamble) may not include ability for the receiving base station or satellite to accommodate a large (differential) RTD or large frequency shift due to the Doppler effect, and may also not include ability to estimate RTD or frequency shift. For example, these preambles may support up to 684 microsecond (μs) RTD and up to 10 kilohertz (kHz) frequency shift within a cell. These limits may be much smaller than differential RTD and frequency shift for an NTN.

These preambles may include a Zadoff-Chu (ZC) root plus a cyclic shift. With this preamble design, in order to be able to identify RTD and the frequency shift (e.g., due to the Doppler effect), the cyclic shift would need to be large enough to encompass the shift caused by both the RTD and the frequency shift. This may also assume that RTD is less than the cyclic shift and the frequency shift is less than 1 or 2 times the sub-carrier spacing (SCS). The RTD and frequency shift associated with an NTN may not meet these requirements of the cyclic shift and preamble for some types of preambles, such as in NR systems.

In cases where the RTD and the frequency shift are large due to the transmission distances in an NTN, a UE may instead generate a preamble that uses ZC sequences and orthogonal frequency division multiplexing (OFDM) modulation, but does not utilize a cyclic shift. These two-root preambles may support communications in networks with larger frequency shifts and longer RTDs. For example, some preambles may support a frequency shift range of ±500 kHz, and an RTD range of up to the minimum of the cyclic prefix (CP) and guard time (GT) (e.g., min (CP, GT)).

Aspects of the disclosure are initially described in the context of wireless communications systems. Aspects of the disclosure are further described in relation to preamble designs, preamble detection systems and process flows. Aspects of the disclosure are further illustrated by and described with reference to apparatus diagrams, system diagrams, and flowcharts that relate to two-root preamble design for delay and frequency shift.

FIG. 1 illustrates an example of a wireless communications system 100 that supports two-root preamble design for delay and frequency shift in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception, or both, by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 includes base stations 105, user terminals 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. Satellite 120 may communicate with base stations 105 and user terminals 115 (such as UEs). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, and the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of a non-terrestrial network. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a user terminal 115 or base station 105, or vice-versa.

UE 115 may communicate with satellites 120 using communications links 125. UEs 115 may utilize a random access procedure including a preamble transmission to obtain communication access with a satellite 120. The satellite 120 may orbit earth and communications between a UE 115 and a satellite 120 may be associated with a long RTD and a frequency shift. The UE 115 may generate and transmit a two-root preamble for detection of the RTD and frequency shift.

Figure 2:
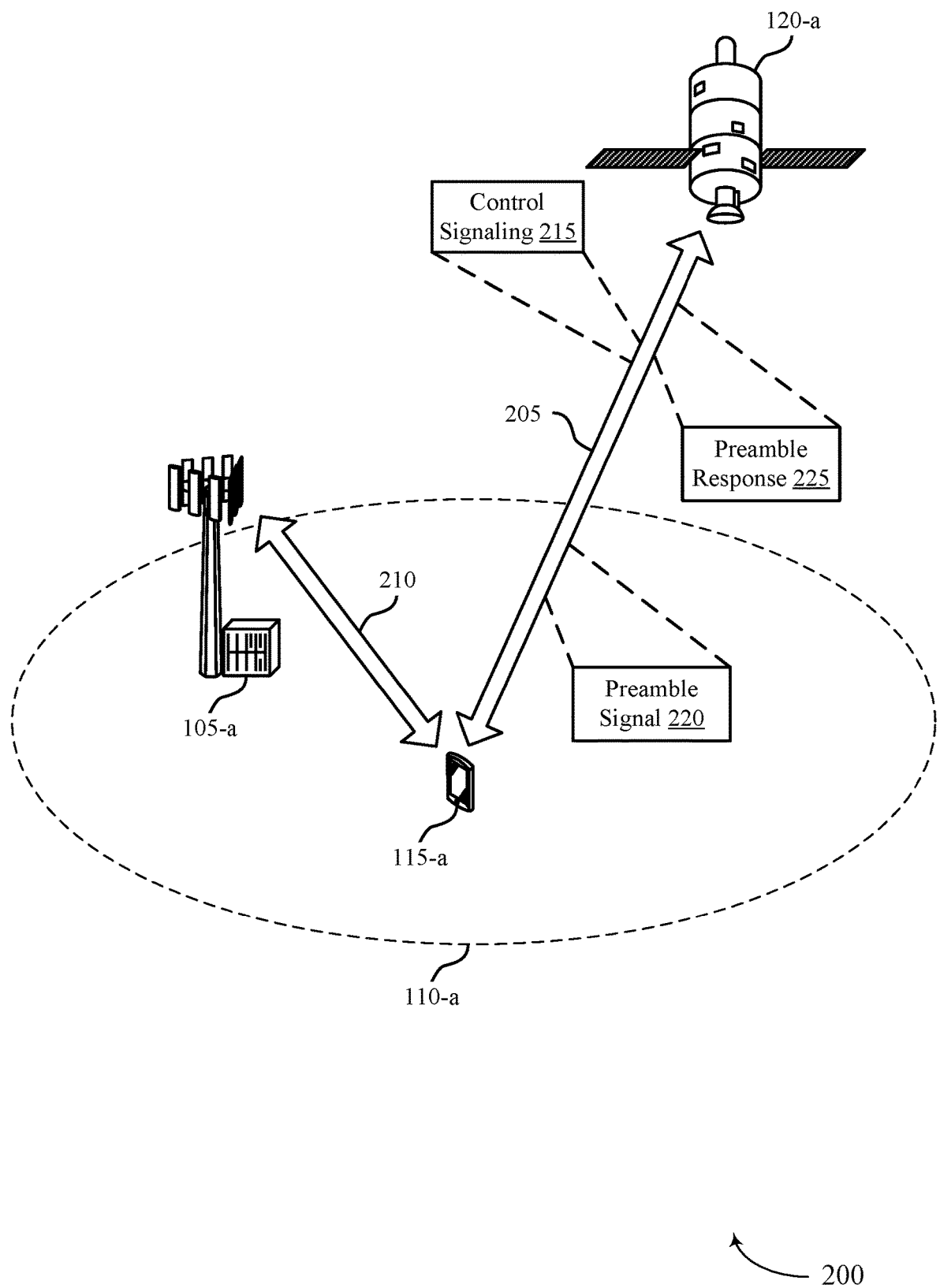
FIG. 2 illustrates an example of a wireless communications system that supports two-root preamble design for delay and frequency shift in accordance with aspects of the present disclosure.

FIG. 2 illustrates an example of a wireless communications system 200 that supports two-root preamble design for delay and frequency shift in accordance with aspects of the present disclosure. In some examples, wireless communications system 200 may implement aspects of wireless communication system 100. Wireless communications system 200 may include base station 105-a, UE 115-a, and satellite 120-a, which may be examples of base station 105, UEs 115, and satellites 120 as described with reference to FIG. 1. Base station 105-a may serve coverage area 110-a in cases of a terrestrial network, and satellite 120-a may serve coverage area 110-a in cases of an NTN. UE 115-a may communicate with satellite 120-a by transmitting signaling in transmission channel 205, and UE 115-a may communicate with base station 105-a by transmitting signaling in transmission channel 210.

UEs 115 may communicate with base stations 105 and satellites 120 as part of wireless communications in an NTN. For example, UE 115-a may communicate with satellite 120-a over communication link 205. In cases of a terrestrial network, UE 115-a may communicate with base station 105-a over communication link 210. In the case of NTN wireless communications, satellite 120-a may be the serving base station for UE 115-a.

Satellite 120-a may orbit the earth's surface at a particular altitude. The distance between satellite 120-a and UE 115-a may be much greater than the distance between base station 105-a and UE 115-a. The distance between UE 115-a and satellite 120-a may cause an increased RTD in communications between UE 115-a and satellite 120-a. The distance may also cause a frequency shift in communications between UE 115-a and satellite 120-a. The frequency shift may be caused by the Doppler effect and error related to the local oscillation of either UE 115-a or satellite 120-a. The RTD and frequency shift associated with communications in NTNs may lead to inefficiency in transmissions, latency, and inability to accurately transmit and receive messages.

UE 115-a may determine to connect to satellite 120-a using a random access procedure (e.g., a four-step RACH). The initiation of the RACH procedure may begin with the transmission of a random access preamble 220 (e.g., NR PRACH) by UE 115-a over communication link 205-a to UE 115-a. UE 115-a may transmit the random access preamble in the PRACH. In some PRACH designs, there may be no estimation or accounting for the RTD or the frequency shift associated with NTNs.

In order to estimate RTD and frequency shift associated with communication with orbiting satellite 120-a in an NTN, UE 115-a may utilize a two-root preamble to initiate the random access procedure to connect to satellite 120-a. The two-root preamble may be based on control signaling 215 transmitted by satellite 120-a over communication link 205-a. Control signaling 215 may include information related to possible ZC roots and sequences for UE 115-a to use to generate a preamble. In some cases, the control signaling 215 may include a set of ZC roots and sequences, or in other cases the set of sequences may be preconfigured at the UE 115-a. In these cases, the control signaling may include bits to indicate to UE 115-a to select roots for a two-root preamble.

The two-root preamble may include two ZC sequences. Each of the two ZC sequences may include different roots. A root may be labeled as $\mu_n$. The roots of the two ZC sequences, for example, may be defined as $\mu_0$ and/$\mu_1$, where $\mu_0 \neq \mu_1$. The two-root preamble as described herein may in some cases not include a cyclic shift allocation. Rather, each root pair may have a zero shift.

The two-root preamble sequence length may be greater than the CP (e.g., sequence length>cyclic prefix) and the guard period (GP) may exceed the RTD. The CP plus the GP of the preamble may be configured to be greater than the RTD between the UE 115 and the satellite 120. Further, the sequence length multiplied by the SCS of the communication channel between the UE 115 and the satellite 120 may configured to be greater than 2 times the maximum of the magnitude of the frequency shift. Thus, the sequence length of the two-root preamble sequence may satisfy the following equation:

$$\text{sequence}_{length} \times SCS > 2 \times \max |Fd| \quad (1)$$

where maxFd is the frequency shift caused by the distance between the UE 115 and the satellite 120.

For example, a preamble may have a sequence length of 839 (e.g., Len-839), and may operate in a system with an SCS of 1.25 kHz. This preamble sequence length may be plugged into Equation 1 as follows:

$$\pm 839 \times 1.25 > 2 \times \max Fd \quad (2)$$

Thus, the preamble sequence (Len-839) may mitigate frequency shifts for frequency shifts of up to ±524 kHz.

The selection of a particular preamble may occur based on the generation of the preamble set. In some cases, a particular radio access technology (RAT) may have a particular preamble set size P (e.g., P=64 in NR). Based on this set size P, P number of pairs $(\mu_{0j}, \mu_{1j})$ of ZC roots may be generated, such that j=0,1, . . . P−1. The pairs may further be generated such that $\mu_{0j} \neq \mu_{0j'}$, and $\mu_{1j} \neq \mu_{1j'}$ for j=0,1, . . . , P−1. In another example, for a preamble set size P, P pairs $(\mu_{0j}, \mu_{1j})$, j=0,1, . . . , P−1 may be generated such that $\mu_{0j} \neq \mu_{0j'}$ or $\mu_{1j} \neq \mu_{1j'}$ for j≠j'. In this second case, there may be, in some instances, at most a number q pairs (e.g., q=2) with the same first root, and at most q pairs with the same second root.

UE 115-a may randomly select a pair of ZC roots from the set of possible pairs of ZC roots. This set of possible pairs of ZC roots may be signaled to UE 115-a in control signaling 215 from satellite 120-a. Based on selecting a pair of ZC roots, UE 115-a may generate a full preamble sequence including a CP. In some cases, the sequences corresponding to each ZC root may be modulated into different OFDM symbols with corresponding CPs, and in some cases the sequences corresponding to each ZC root may be modulated into the same OFDM symbol with one leading CP.

UE 115-a may transmit the two-root preamble signal 220 to satellite 120-a to initiate a random access procedure. Satellite 120-a may receive the preamble signal, and may determine the RTD and Doppler shift based on the preamble signal 220. Satellite 120-a may transmit a preamble response 225 to UE 115-a to continue the random access procedure between UE 115-a and satellite 120-a.

In some cases, multiple UEs 115 within a coverage area or connected to the same serving base station 105 or satellite 120 may select the same root pair for the preamble. In this case, there may be a collision between preamble transmissions of the two UEs 115 that selected the same ZC root pair. This may lead to a transmission failure, and a UE 115 may not receive a preamble response from the satellite 120 that the UE 115 transmitted the preamble to. In some cases, UE 115-*a* may retransmit the same preamble or generate and transmit a new preamble based on a different ZC root pair.

In some cases, UE 115-*a* may transmit a two-root preamble over communication link 210 to a terrestrial base station 105-*a* to initiate a random access procedure with base station 105-*a* rather than with a non-terrestrial satellite 120-*a*. This may include base station 105-*a* determining the RTD and Doppler shift based on the two-root preamble received from UE 115-*a*. The base station 105-*a* may then transmit a preamble response to UE 115-*a* to continue the RACH process.

Figure 3A:
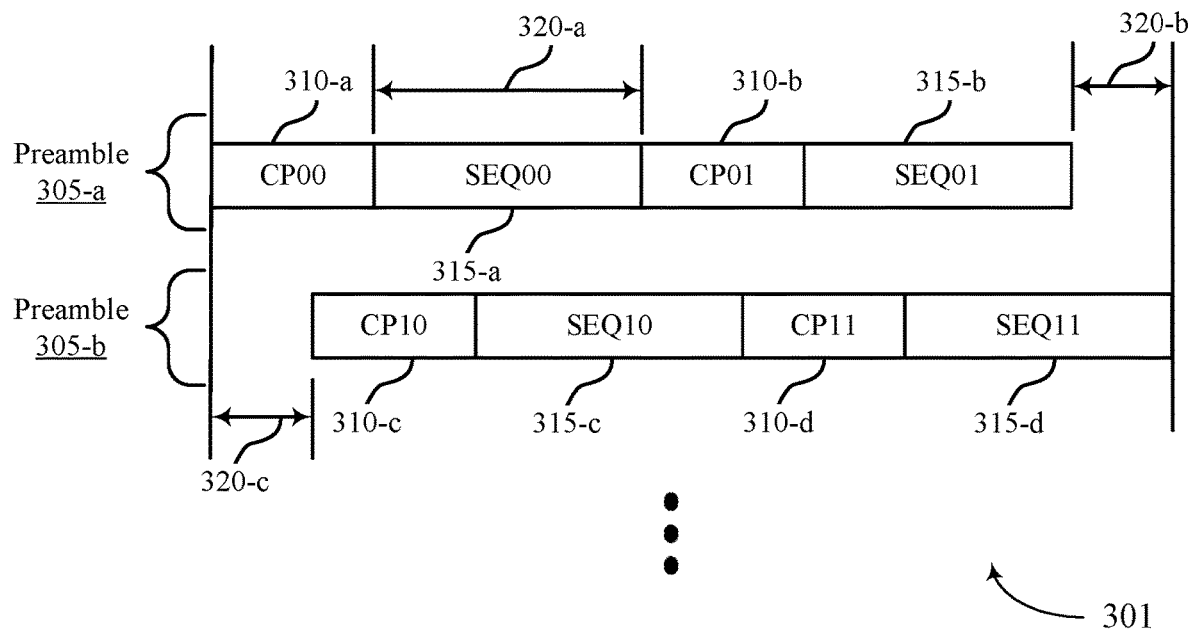
FIGS. 3A and 3B illustrate examples of two-root preamble designs for delay and frequency shift in accordance with aspects of the present disclosure.

FIG. 3A illustrates an example of a two-root preamble design 301 for delay and frequency shift in accordance with aspects of the present disclosure. In some examples, preamble design 301 may implement aspects of wireless communication system 100. A preamble generated according to preamble design 301 may be transmitted by a UE 115 to a satellite 120 or base station 105 as described with respect to FIG. 2. Preamble 305-*a* may be an example of one possible preamble generated based on a first ZC root pair selection. Preamble 305-*b* may be an example of another possible preamble generated based on a second ZC root pair selection. There may be a number of further possible preambles 305 based on a number of other possible ZC root pair selections. Preamble design 301 may lead to a longer symbol length and a lower peak-to-average power ratio (PAPR).

Based on the generation of the preamble set and selection of the ZC root pair, the UE 115 may generate a random access preamble 305. A UE 115 may generate multiple different preambles based on the ZC root pair selected. The ZC root pair may be selected as described with respect to FIG. 2. In some cases, a UE 115 may generate a first preamble 305-*a*, a second preamble 305-*b*, or a subsequent preamble (e.g., up to 64 preambles in the case of 5G NR). The UE 115 may select a pair of ZC root preamble sequences from the set of ZC preamble sequences (e.g., advertised by the base station 105, or with which the UE is preconfigured, etc.) to generate two preamble sequences (e.g., SEQ00 and SEQ01) of the preamble 305. The UE 115 may also copy a portion of the end of the preamble sequence (e.g., SEQ00) and place the copied portion (e.g., CP00) at the beginning of the preamble sequence to generate the preamble 305, so that detection of the preamble by the base station or satellite may overlap with the end of the CP and still detect the entire preamble sequence.

For example, CP00 310-*a* and a sequence (e.g., SEQ00) may correspond to one ZC root pair of the two ZC root pairs selected for the preamble. SEQ00 may be modulated into one OFDM symbol 315-*a* of length 320-*a*. The second selected ZC root pair may correspond to a second CP00 310-*b* and a second sequence, SEQ01. SEQ01 may be modulated into a second OFDM symbol 315-*b*.

Subsequently, the two OFDM symbols 315 may be concatenated back to back including the corresponding CPs 310. Thus, the full random access preamble 305-*a* may include sequentially CP00 310-*a*, SEQ00 in OFDM symbol 315-*a*, followed by CP01 310-*b*, and SEQ01 in OFDM symbol 315-*b*.

Another preamble 305-*b* may be generated similarly, with CP10 310-*c* and SEQ10 modulated into one OFDM symbol 315-*c*, concatenated back to back with a second CP11 310-*d* and SEQ11, where SEQ11 is modulated into a second OFDM symbol 315-*d*.

Preamble 305-*b* may be offset from Preamble 305-*a* by a guard period (GP) 320-*c*. GP 320-*c* may be less than or equal to the RTD of the communications between the UE 115 and the satellite 120 (or base station 105). The end of preamble 305-*a* and the end of preamble 305-*b* may also be separated by a GP 320-*b*. GP 320-*b* may also be less than or equal to the RTD. One or more preambles 305 may be similarly generated, and thus preamble design 301 may be applied to generate a desired number of preambles 305. The UE 115 may select one of the preambles 305 (e.g., 305-*a*), generate a preamble signal using the selected preamble 305-*a*, and transmit the preamble signal during a random access procedure (e.g., RACH procedure).

Figure 3B:
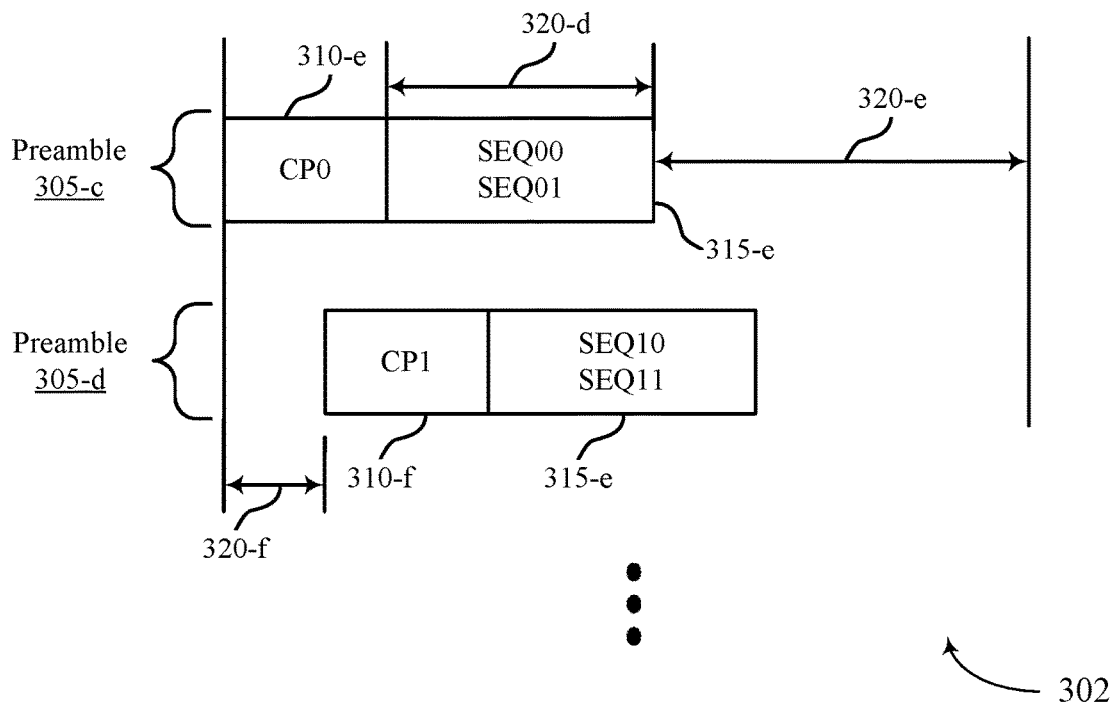

FIG. 3B illustrates an example of a two-root preamble design 302 for delay and frequency shift in accordance with aspects of the present disclosure. A preamble generated according to preamble design 302 may be transmitted by a UE 115 to a satellite 120 or base station 105 as described with respect to FIG. 2. Preamble 305-*c* may be an example of one possible preamble generated based on a first ZC root pair selection. Preamble 305-*d* may be an example of another possible preamble generated based on a ZC root pair selected by the UE 115. There may be a number of further possible preambles 305 based on a number of other possible ZC root pairs.

The preamble design 302 may generate a shorter symbol as compared to preamble design 301 at the cost of a high PAPR. A UE 115 may generate a first preamble 305-*c*, a second preamble 305-*d*, or a subsequent preamble (e.g., up to 64 preambles in the case of 5G NR). The UE 115 may select a pair of ZC preamble sequence roots from the set of ZC root preamble sequences (e.g., advertised by the base station 105, or with which the UE is preconfigured, etc.) to generate a pair of preamble sequences (e.g., SEQ10 and SEQ11). The UE 115 may also copy a portion of the end of the preamble sequence (e.g., SEQ00) and place the copied portion (e.g., CP00) at the beginning of the preamble sequence to generate the preamble 305, so that detection of the preamble by the base station or satellite may overlap with the end of the CP and still detect the entire preamble sequence.

The preambles 305 in preamble design 302 may be generated using a different modulation scheme than the preambles described in preamble design 301. In this case, preamble 305-*c* may be generated by a UE 115. The two sequences corresponding to the two selected ZC roots may be modulated into a single OFDM symbol 315 (e.g., on different subcarriers). For example, SEQ00 may be associated with a first ZC root and SEQ01 may be associated with a second ZC root. SEQ00 and SEQ01 may be DFT-transformed onto the same or different frequency bands (e.g., on adjacent or non-adjacent sub-carriers), and then modulated into a single OFDM symbol 315-*e*. The generation of preamble 305-*c* may include a CP0 310-*e* added to the beginning of the OFDM symbol 315-*e*.

A second preamble, preamble 305-*d* may be generated in a similar manner as preamble 305-*c*. However, preamble 305-*d* may include a GP 320-*f* that separates the beginning of the CP1 310-*f* from the beginning of CP0 310-*e* and its corresponding sequence in time. For preamble 305-*d*, two sequences, SEQ10 and SEQ11 may be generated based on two different ZC roots. The two sequences SEQ10 and SEQ11 may be DFT-transformed onto the same or different frequency bands, and then may be modulated into a single OFDM symbol 315-*e*. One or more preambles 305 may be similarly generated, and thus preamble design 302 may be applied to generate a desired number of preambles 305. The UE 115 may select one of the preambles 305 (e.g., 305-*c*), generate a preamble signal using the selected preamble 305-*a*, and transmit the preamble signal during a random access procedure (e.g., RACH procedure).

Figure 4:
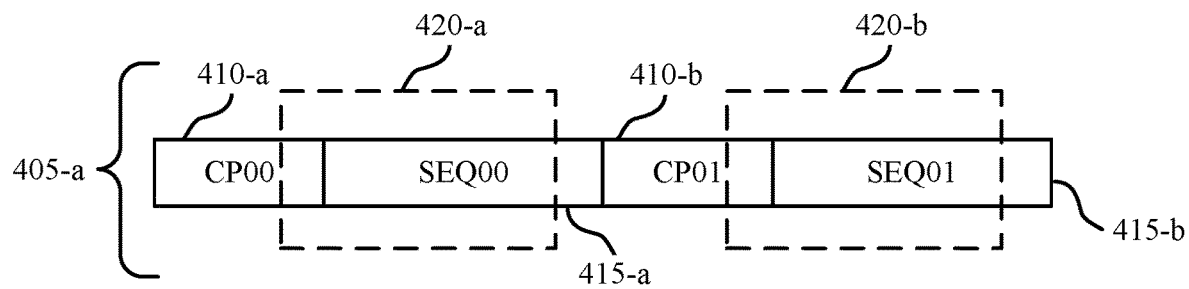
FIG. 4 illustrates an example of a preamble detection system that supports two-root preamble design for delay and frequency shift in accordance with aspects of the present disclosure.
Figure 4:
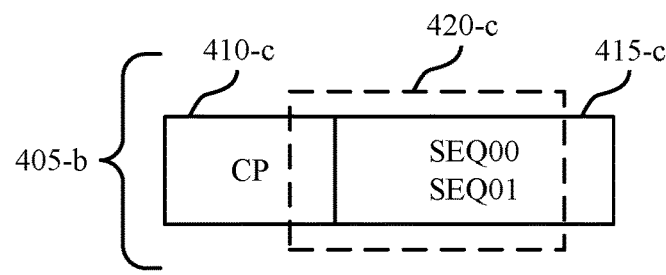
Figure 4:
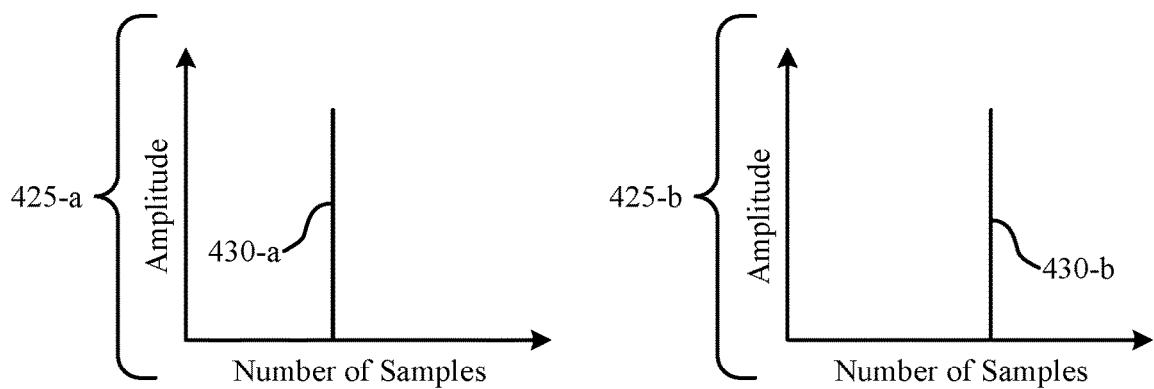

FIG. 4 illustrates an example of a preamble detection system 400 that supports two-root preamble design for delay and frequency shift in accordance with aspects of the present disclosure. In some examples, preamble detection system 400 may implement aspects of wireless communication system 100. A UE 115 may generate preamble 405-a according to preamble design 301. Alternatively or additionally, UE 115 may generate preamble 405-b according to preamble design 302. UE 115 may transmit a preamble 405 to a satellite 120. Satellite 120 may cut a fast-Fourier transform (FFT) window 420 (e.g., use multiple FFT windows) in order to detect root pair sequences in the preamble or may apply a single FFT window if the preamble is multiplexed in frequency.

Based on generating a preamble 305 (e.g., Preamble 305-a or 305-b) as described with respect to FIGS. 3A and 3B, a UE 115 may transmit the generated preamble to a base station 105 or a satellite 120 to initiate a PRACH procedure. In an NTN, a satellite 120 may detect a preamble 405 received from a UE 115.

In some cases, a UE 115 may generate preamble 405-a corresponding to preamble design 301. In other cases, a UE 115 may generate preamble 405-b corresponding to preamble design 302. Either of preamble 405-a or 405-b may include two sequences generated based on a selected ZC root of a number of possible ZC roots.

In order to detect the preamble 405-a, a satellite 120 may cut an FFT window 420 to detect the separate sequences of the preamble (e.g., SEQ00 and SEQ01 in OFDM symbols 415). For examples, a UE 115 may transmit a random access preamble 405-a to a satellite 120. The satellite 120 may cut FFT window 420-a for the detection of the first root sequence SEQ00 in OFDM symbol 415-a. The satellite 120 may also cut FFT window 420-b for detection of the second root sequence SEQ01 in OFDM symbol 415-b. The FFT window may in some cases cover the end of the CP and not the end of the preamble. The appending of the end of the sequence to the end of the CP when the preamble is generated accommodates for this and ensures the preamble is still detected in full.

The satellite 120 may detect the selected ZC roots. The ZC roots may be defined as $\mu_0$ and $\mu_1$ for SEQ00 and SEQ01, respectively. Satellite 120 may detect the roots based on identifying correlation peaks 430. Because the ZC pairs used to generate the preamble sequences may be orthogonal, a correlation peak 430 may be detected when correlating a preamble sequence with the root used to generate the preamble sequence. When using a different root, the amplitude output by the correlation process may not include a correlation peak (e.g., have a similar amplitude as other roots), and thus the base station or satellite may determine that a root was not detected when a correlation peak is not found. The base station 105 or satellite 120 may check each root in the set of roots advertised to the UE 115 until a correlation peak has been identified, or all roots have been tested without identifying a correlation peak (e.g., error case).

For example, correlation peak 430-a may be identified on a graph 425-a of number of samples and amplitude for the first root, $\mu_0$, due to the UE 115 generating the preamble sequence (e.g., SEQ00) using first root preamble sequence, $\mu_0$. Correlation peak 430-b may be identified on graph 425-b for SEQ01 and for root $\mu_1$, due to the UE 115 generating the preamble sequence (e.g., SEQ01) using second root preamble sequence, $\mu_1$. Due to the wireless channel between the UE 115 and the base station 105 (or satellite 120), each correlation peak 430-a and 430-b may be shifted by RTD and frequency shift due to the Doppler effect between the UE 115 transmitting the preamble 405 and the satellite 120 detecting the preamble 405. However, the frequency shift and RTD may not impact the detection of the roots. Each detected root $\mu_0$ and $\mu_1$ may be paired to complete the preamble detection. Based on detecting the roots $\mu_0$ and $\mu_1$, satellite 120 may estimate the RTD and the frequency shift.

In a system where there may be q number of same roots $\mu_n$ there may be q possible peak locations retained by the satellite 120. However, the detection of the roots may remain unambiguous regardless of the number of possible peak locations.

In some cases, the satellite 120 may assume that q=1. In this case, a number of assumptions may be included in the estimation of the RTD and frequency shift. These assumptions may include that peak locations are integer multiples of samples, where the samples may be denoted by $b_0$, $b_1$. The assumptions may also include that the RTD is measured in integer numbers of samples, that the Doppler shift is measured in an integer multiple of SCS, and that roots $\mu_0$ and $\mu_1$ have inverse roots $\mu_0^{-1}$, and $\mu_1^{-1}$. Based on these assumptions, two equations can be solved in order to calculate RTD (denoted as delay in Equation 3) and frequency shift (denoted as doppler in Equation 3).

$$\text{delay} + \text{doppler} \times \mu_n^{-1} \equiv b_n \pmod{N} \quad (3)$$

Satellite 120 may solve equation 3 for each root $\mu_0$ and $\mu_1$. In some situations, the range of delay may be less than N and the range of doppler may be less than N. In such cases, Equation 3 and Equation 4 in the following solution may uniquely identify delay and doppler. The solution equation for RTD is as follows:

$$\text{doppler} \equiv (\mu_0^{-1} - \mu_1^{-1})^{-1} \times (b_0 - b_1) \pmod{N} \quad (4)$$

The solution equation for frequency shift is as follows:

$$\text{delay} \equiv b_0 - (1 - \mu_0 \mu_1^{-1})^{-1} \times (b_0 - b_1) \pmod{N} \quad (5)$$

In cases where the range of delay is less than the sequence length N of the preamble, and the range of Doppler is less than the sequence length N of the preamble, Equations 4 and 5 may uniquely identify the RTD and the Doppler shift caused by the distance between the UE 115 transmitting the preamble and the satellite 120 (or base station 105 in cases of a terrestrial network) that receives and demodulates the preamble.

Alternatively or additionally, q may be greater than 1. In this cases, there may be at most $q^2$ peak location pair for $\mu_0$ and $\mu_1$. In this case, $q^2-1$ pairs may be removed from the list of potential pairs. In one example, delay and Doppler may be solved separately for each root pair possibility. In this example, impossible values of delay and Doppler may be removed. These impossible values may be removed if there is a prior indication of the range of delay and Doppler, so that values outside of the range may be removed. Further, P pairs of $(\mu_0, \mu_1)$ may be selected judiciously such that peak location pairs may be removed accordingly.

Thus, a satellite 120 may jointly detect the preamble transmitted by a UE 115 and also estimate the RTD and frequency shift (e.g., Doppler effect) caused by the distance between the UE 115 and the satellite 120. With 120 kHz SCS, the preamble transmission and RACH process may withstand a Doppler shift of up to ±500 kHz, and the CP may be long enough to cover the maximum delay differential.

The estimation of RTD and Doppler shift may depend on the location of the detected peaks. This may lead to potential error in estimations found by Equations 4 and 5. The error may occur in number of samples $b_0$ and $b_1$. The error in these samples is scaled by $(\mu_0^{-1}-\mu_1^{-1})^{-1}$ as shown in Equations 4 and 5. Thus, error may be decreased by the UE 115 selecting root pairs $\mu_0$ and $\mu_1$ such that $(\mu_0^{-1})^{-1}=1$ or is small (e.g., less than or equal to a threshold), so that any potential error in $b_0$ and $b_1$ may not be scaled by a factor greater than 1.

Similarly, a satellite 120 may receive preamble 405-*b*, which may be a preamble generated by a UE 115 according to preamble design 302 and transmitted by the UE 115 to the satellite 120. Satellite 120 may demodulate preamble 405-*b* by cutting FFT window 420-*c* to detect the two-roots of the preamble, SEQ00 and SEQ01 in OFDM symbol 415-*c*.

The two-roots of preamble 405-*b* may correspond to correlation peaks 430-*a* and 430-*b* after the correlation process by satellite 120. Satellite 120 may solve Equations 3, 4, and 5 to determine the delay and Doppler effect for preamble 405-*b*. In some cases, satellite 120 may transmit an indication of the estimated delay and Doppler effect to the UE 115.

Figure 5:
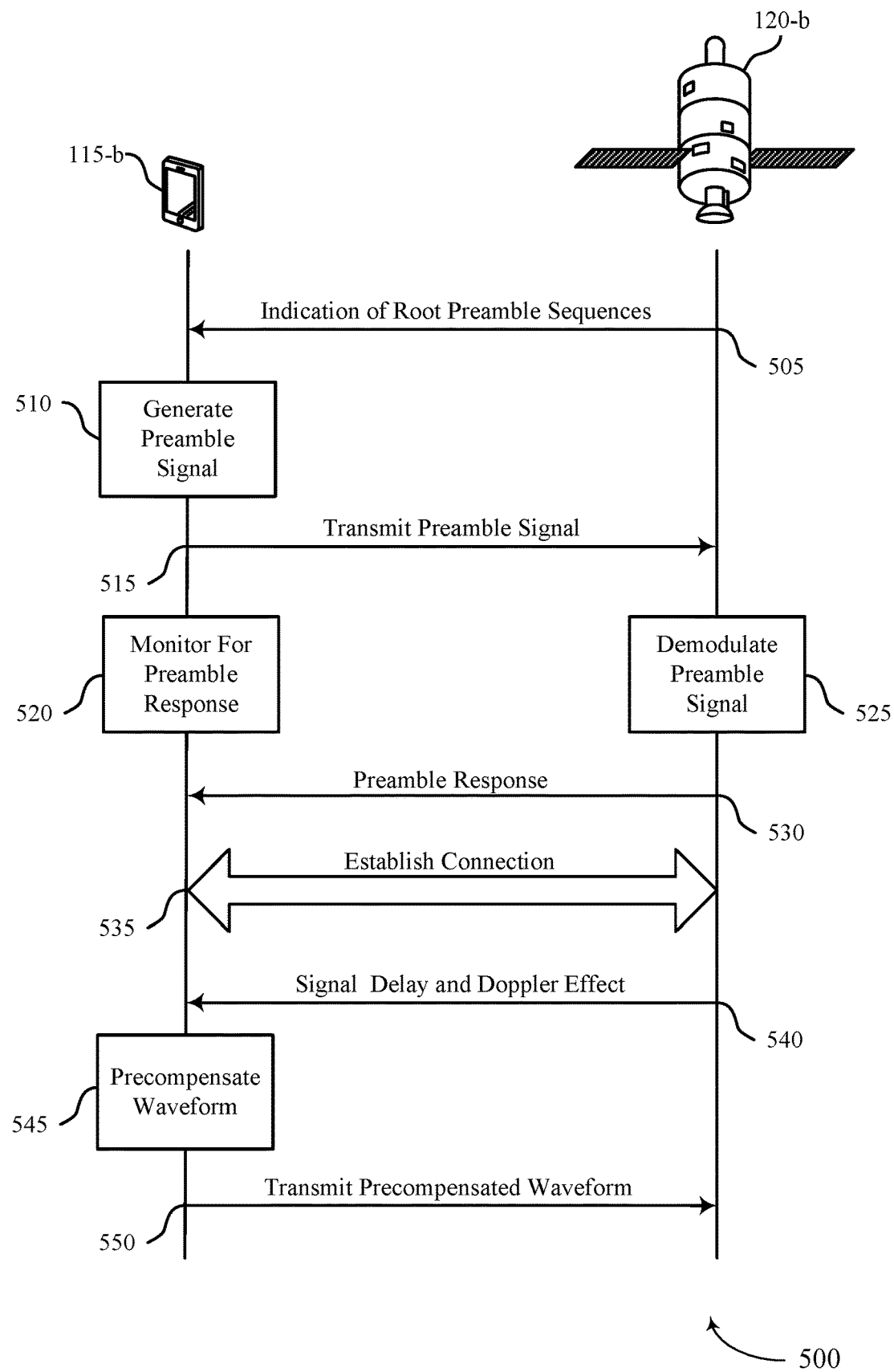
FIG. 5 illustrates an example of a process flow that supports two-root preamble design for delay and frequency shift in accordance with aspects of the present disclosure.

FIG. 5 illustrates an example of a process flow 500 that supports two-root preamble design for delay and frequency shift in accordance with aspects of the present disclosure. In some examples, process flow 500 may implement aspects of wireless communication system 100. The process flow 500 may illustrate an example of two-root preamble generation and transmission by a UE 115. UE 115-*b* may be an example of UEs 115 as described with reference to FIGS. 1 through 4. Satellite 120-*b* may be an example of Satellites 120 as described with reference to FIGS. 1 through 4. Satellite 120 may be an example of a non-terrestrial base station. In some cases, Satellite 120 may instead be a base station 105 in a terrestrial network. Alternative examples of the following may be implemented, where some steps are performed in a different order than described or are not performed at all. In some cases, steps may include additional features not mentioned below, or further steps may be added.

Wireless device 120-*b* may be shown as a satellite in process flow 500. Wireless device 120-*b* may be a satellite 120-*b* in an NTN, but in other cases may be a terrestrial base station (e.g., a base station 105 as described with respect to FIGS. 1 and 2).

At 505, satellite 120-*b* may transmit control signaling that indicates a set of root preamble sequences (e.g., a set of ZC roots $\mu_0, \mu_1, \ldots, \mu_N$. At 505, UE 115-*b* may receive control signaling from satellite 120-*b* that indicates a set of root preamble sequences.

At 510, UE 115-*b* may generate a preamble signal (e.g., preamble 305 that includes a cyclic prefix and preamble sequence). The generation of the preamble signal may include generating a set of preamble sequence pairs based on the set of root preamble sequences, where each first tuple of each preamble sequence pair of the set of preamble sequence pairs is unique and each second tuple in each preamble sequence pair of the set of preamble sequence pairs is unique. Further, UE 115-*b* may generate a set of preamble sequence pairs based on the set of root preamble sequences, where each first tuple of each preamble sequence pair of the set of preamble sequence pairs is unique.

UE 115-*b* may append a first CP to the first root preamble sequence and a second CP to the second root preamble sequence to generate a combined sequence, where the preamble signal is generated based on the combined preamble sequence. UE 115-*b* may append a first CP to the first root preamble sequence to generate a first appended preamble sequence and a second CP to the second root preamble sequence to generate a second appended preamble sequence.

At 515, UE 115-*b* may transmit a preamble signal that is generated based on a first root preamble sequence and a second root preamble sequence of the set of root preamble sequences. In some cases, UE 115-*b* may transmit the preamble signal over two symbol periods that are sequential in time. In other cases, UE 115-*b* may transmit a first preamble signal that generated based on the first root preamble sequence during a first symbol period, and transmit a second preamble signal that generated based on the second root preamble sequence during a second symbol period that is sequential in time.

In some cases, transmitting the preamble signal may include transmitting the preamble signal that is generated based on a first root preamble sequence pair that comprises the first root preamble sequence and the second root preamble sequence.

UE 115-*b* may transmit, in a first frequency resource, a first preamble signal that is generated based on the first appended preamble sequence (e.g., CP0+SEQ00). UE 115-*b* may also transmit, in a second frequency resource, a second preamble signal that is generated based on the second appended preamble sequence (e.g., CP1+SEQ01). In some cases, the first a second preamble signals are transmitted during a single symbol period.

A GT may satisfy an RTD threshold. A length of each of the first root preamble sequence and of the second root preamble sequence may satisfy a CP length threshold. Each of the first root preamble sequence and the second root preamble sequence may be a ZC sequence.

At 515, satellite 120-*b* may receive a preamble signal that is generated based on a first root preamble sequence and a second root preamble sequence of the set of root preamble sequences. The reception of the preamble signal may include receiving the preamble signal over two symbol periods that are sequential in time. The reception of the preamble signal may also include receiving a first preamble signal that generated based on the first root preamble sequence during a first symbol period, and receiving a second preamble signal that generated based on the second root preamble sequence during a second symbol period that is sequential in time to the first symbol period. The reception of the preamble signal may also include receiving the preamble signal that is generated based on a first root preamble sequence pair that includes the first root preamble sequence and the second root preamble sequence. Satellite 120-*b* may receive, in a first frequency resource, a first preamble signal and may receive in a second frequency resource, a second preamble signal. The first and second preamble signals may be transmitted by UE 115-*b* during a single symbol period.

At 520, UE 115-*b* may monitor for a preamble response based on the preamble signal. In some cases, based on monitoring for the response, UE 115-*b* may transmit a second preamble signal based on determining that the preamble response has not been received from satellite 120-*b*.

At 525, satellite 120-*b* may demodulate the received preamble signal. This may include performing a first correlation of a first signal received during the first symbol period with each of the set of root preamble sequences to identify the first root preamble sequence. Satellite 120-*b* may also perform a second correlation of a second signal received during the second symbol period with each of the set of root preamble sequences to identify the second root preamble sequence. Satellite 120-*b* may identify a doppler shift, a delay, or both, based on the first correlation, the second correlation, or both, and may use the identified doppler shift or delay, or both, for demodulating subsequent transmissions received from the UE 115-*b*.

At 530, satellite 120-*b* may transmit a preamble response based on the preamble signal. At 530, UE 115-*b* may receive the preamble response from satellite 120-*b*. At 535, UE 115-*b* may establish connectivity with satellite 120-*b* based on the preamble response. Satellite 120-*b* may establish connectivity with UE 115-*b* based on the preamble response.

At 540, satellite 120-*b* may transmit a doppler indicator, a delay indicator, or both, based on the preamble signal. UE 115-*b* may receive a doppler indicator, a delay indicator, or both, based on the preamble signal.

At 550, UE 115-*b* may transmit a data transmission, a control transmission, or both, using a waveform that is pre-compensated based on the doppler indicator, the delay indicator, or both (e.g., adjust the waveform to reduce or remove the impact of doppler or delay, or both, on a data transmission, a control transmission, or both, received at the satellite 120-*b*). Satellite 120-*b* may receive a data transmission, a control transmission, or both, using a waveform that is pre-compensated based on the doppler indicator, the delay indicator, or both. Satellite 120-*b* may demodulate a data transmission, a control transmission, or both, based on the doppler indicator, the delay indicator, or both.

Figure 6:
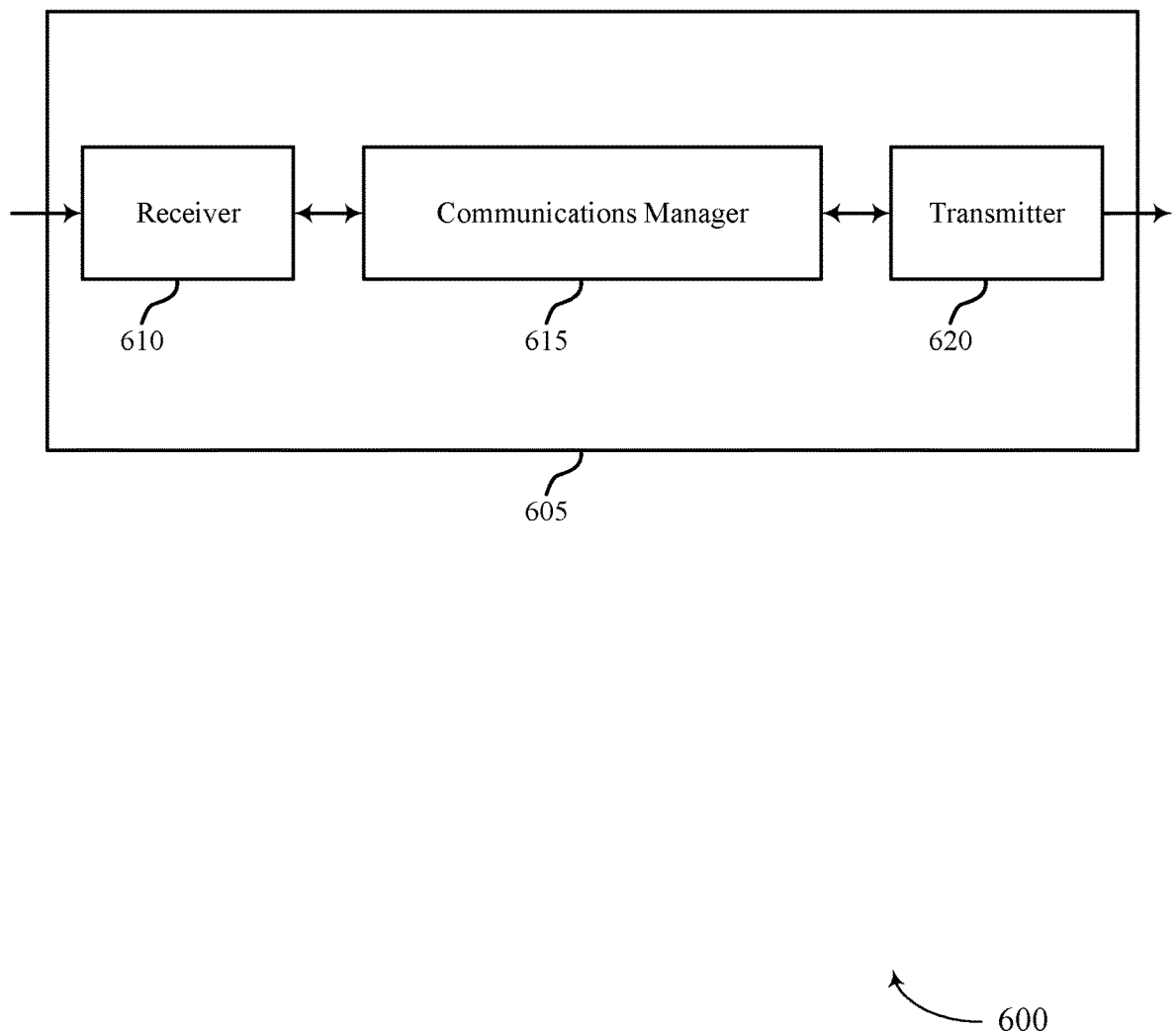
FIGS. 6 and 7 show block diagrams of devices that support two-root preamble design for delay and frequency shift in accordance with aspects of the present disclosure.

FIG. 6 shows a block diagram 600 of a device 605 that supports two-root preamble design for delay and frequency shift in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to two-root preamble design for delay and frequency shift, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive control signaling that indicates a set of root preamble sequences, transmit a preamble signal that is generated based on a first root preamble sequence and a second root preamble sequence of the set of root preamble sequences, and monitor for a preamble response based on the preamble signal. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 described herein may be implemented as a chipset of a wireless modem, and the receiver 610 and the transmitter 620 may be implemented as sets of analog components (e.g., amplifiers, filters, phase shifters, antennas, etc.). The wireless modem may obtain and decode signals from the receiver 610 over a receive interface, and may output signals for transmission to the transmitter 620 over a transmit interface.

The actions performed by the communications manager as described herein may be implemented to realize one or more potential advantages. One implementation may allow a UE 115 to communicate more efficiently in an NTN. The UE 115 may pre-compensate subsequent transmissions based on receiving, with receiver 610, and indication of delay and doppler effect. The pre-compensated signal may be transmitted by transmitter 620. This may lead to increased efficiency and high reliability transmissions by UEs 115 and satellites 120 (or base stations 105 in a terrestrial network.

Figure 7:
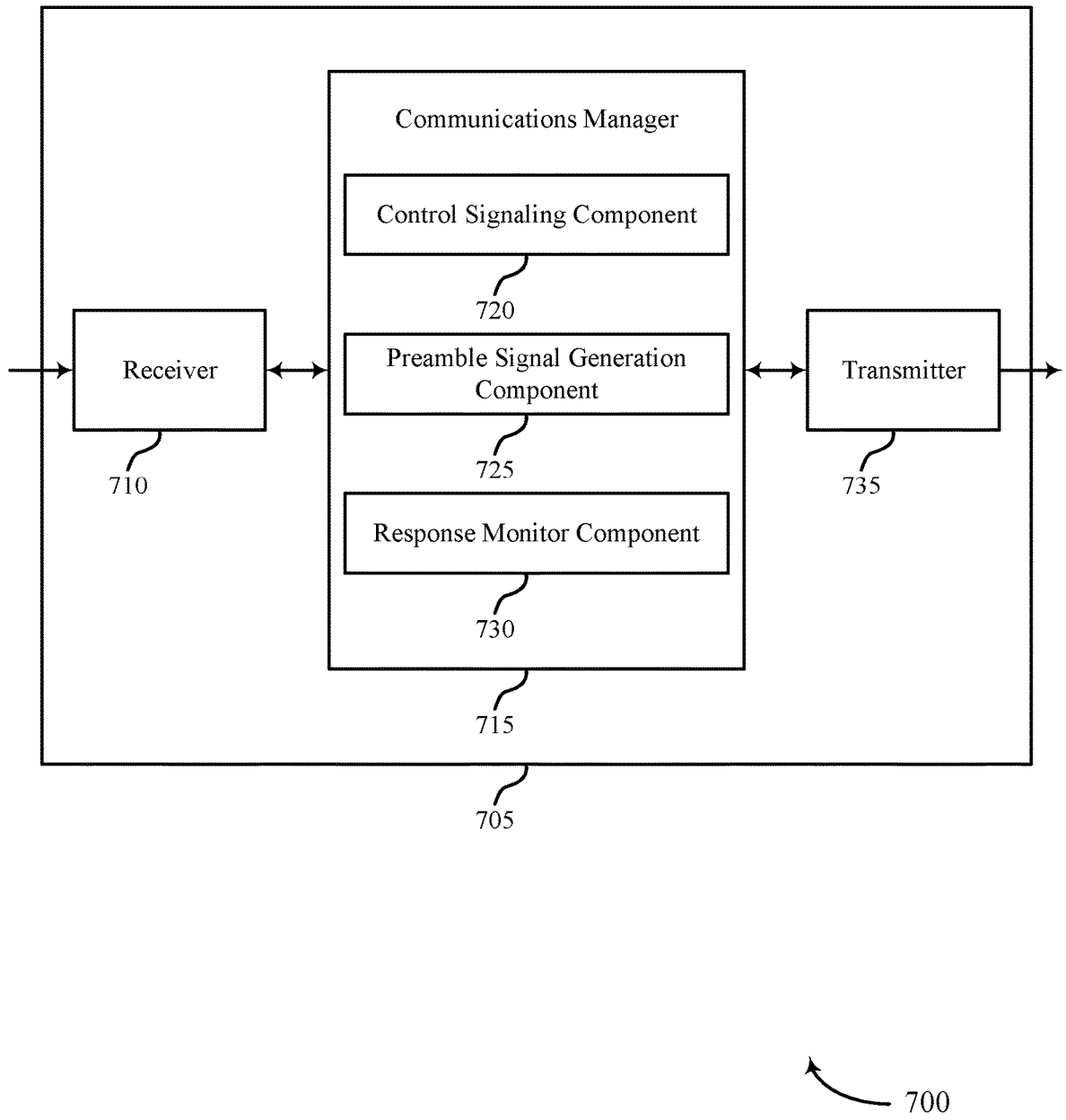

FIG. 7 shows a block diagram 700 of a device 705 that supports two-root preamble design for delay and frequency shift in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to two-root preamble design for delay and frequency shift, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a control signaling component 720, a preamble signal generation component 725, and a response monitor component 730. The communications manager 715 may be an example of aspects of the communications manager 910 described herein.

The control signaling component 720 may receive control signaling that indicates a set of root preamble sequences.

The preamble signal generation component 725 may transmit a preamble signal that is generated based on a first root preamble sequence and a second root preamble sequence of the set of root preamble sequences.

The response monitor component 730 may monitor for a preamble response based on the preamble signal.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
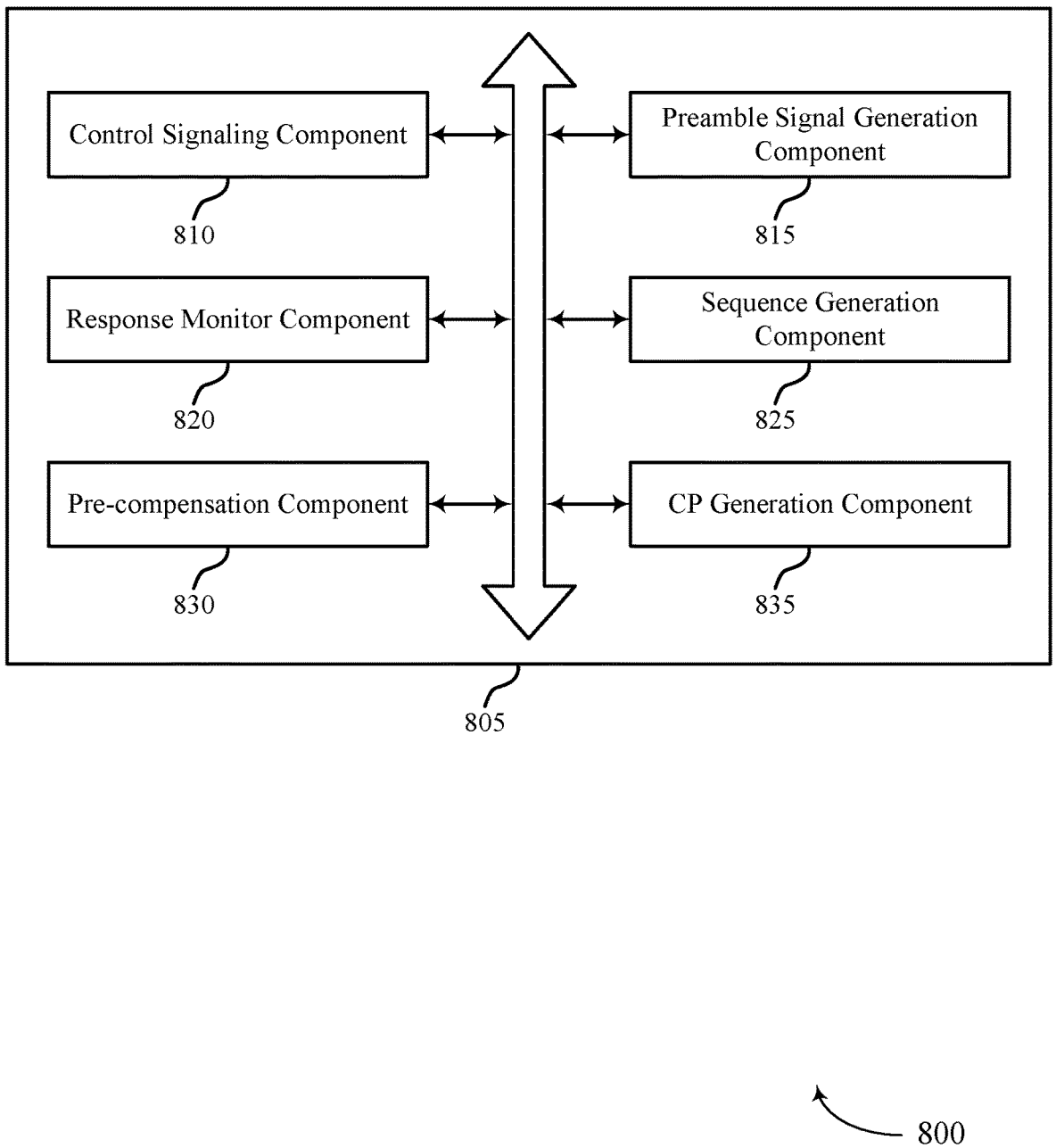
FIG. 8 shows a block diagram of a communications manager that supports two-root preamble design for delay and frequency shift in accordance with aspects of the present disclosure.

FIG. 8 shows a block diagram 800 of a communications manager 805 that supports two-root preamble design for delay and frequency shift in accordance with aspects of the present disclosure. The communications manager 805 may be an example of aspects of a communications manager 615, a communications manager 715, or a communications manager 910 described herein. The communications manager 805 may include a control signaling component 810, a preamble signal generation component 815, a response monitor component 820, a sequence generation component 825, a pre-compensation component 830, and a CP generation component 835. Each of these modules may communicate, directly or indirectly, with one another (e.g., via one or more buses).

The control signaling component 810 may receive control signaling that indicates a set of root preamble sequences. The preamble signal generation component 815 may transmit a preamble signal that is generated based on a first root preamble sequence and a second root preamble sequence of the set of root preamble sequences. In some examples, the preamble signal generation component 815 may transmit the preamble signal over two symbol periods that are sequential in time. In some examples, the preamble signal generation component 815 may transmit a first preamble signal that generated based on the first root preamble sequence during a first symbol period.

In some examples, the preamble signal generation component 815 may transmit a second preamble signal that generated based on the second root preamble sequence during a second symbol period that is sequential in time to the first symbol period.

In some examples, transmitting the preamble signal that is generated based on a first root preamble sequence pair that includes the first root preamble sequence and the second root preamble sequence. In some examples, the preamble signal generation component 815 may transmit, in a first frequency resource, a first preamble signal that is generated based on the first appended preamble sequence.

In some examples, the preamble signal generation component 815 may transmit, in a second frequency resource, a second preamble signal that is generated based on the second appended preamble sequence. In some cases, the first and second preamble signals are transmitted during a single symbol period. In some cases, a guard time satisfies a round trip delay threshold. In some cases, a length of each of the first root preamble sequence and of the second root preamble sequence satisfies a cyclic prefix length threshold. In some cases, each of the first root preamble sequence and the second root preamble sequence is a Zadoff-Chu sequence.

The response monitor component 820 may monitor for a preamble response based on the preamble signal. In some examples, the response monitor component 820 may transmit a second preamble signal based on determining that the preamble response has not been received. In some examples, the response monitor component 820 may receive the preamble response from a satellite or a base station. In some examples, the response monitor component 820 may establish connectivity with the satellite or the base station based on the preamble response.

The sequence generation component 825 may generate a set of preamble sequence pairs based on the set of root preamble sequences, where each first tuple of each preamble sequence pair of the set of preamble sequence pairs is unique and each second tuple in each preamble sequence pair of the set of preamble sequence pairs is unique.

In some examples, the sequence generation component 825 may generate a set of preamble sequence pairs based on the set of root preamble sequences, where each first tuple of each preamble sequence pair of the set of preamble sequence pairs is unique or each second tuple in each preamble sequence pair of the set of preamble sequence pairs is unique.

The pre-compensation component 830 may receive a doppler indicator, a delay indicator, or both, based on the preamble signal. In some examples, the pre-compensation component 830 may transmit a data transmission, a control transmission, or both, using a waveform that is pre-compensated based on the doppler indicator, the delay indicator, or both.

The CP generation component 835 may append a first cyclic prefix to the first root preamble sequence and a second cyclic prefix to the second root preamble sequence to generate a combined root preamble sequence, where the preamble signal is generated based on the combined preamble sequence. In some examples, the CP generation component 835 may append a first cyclic prefix to the first root preamble sequence to generate a first appended preamble sequence and a second cyclic prefix to the second root preamble sequence to generate a second appended preamble sequence.

Figure 9:
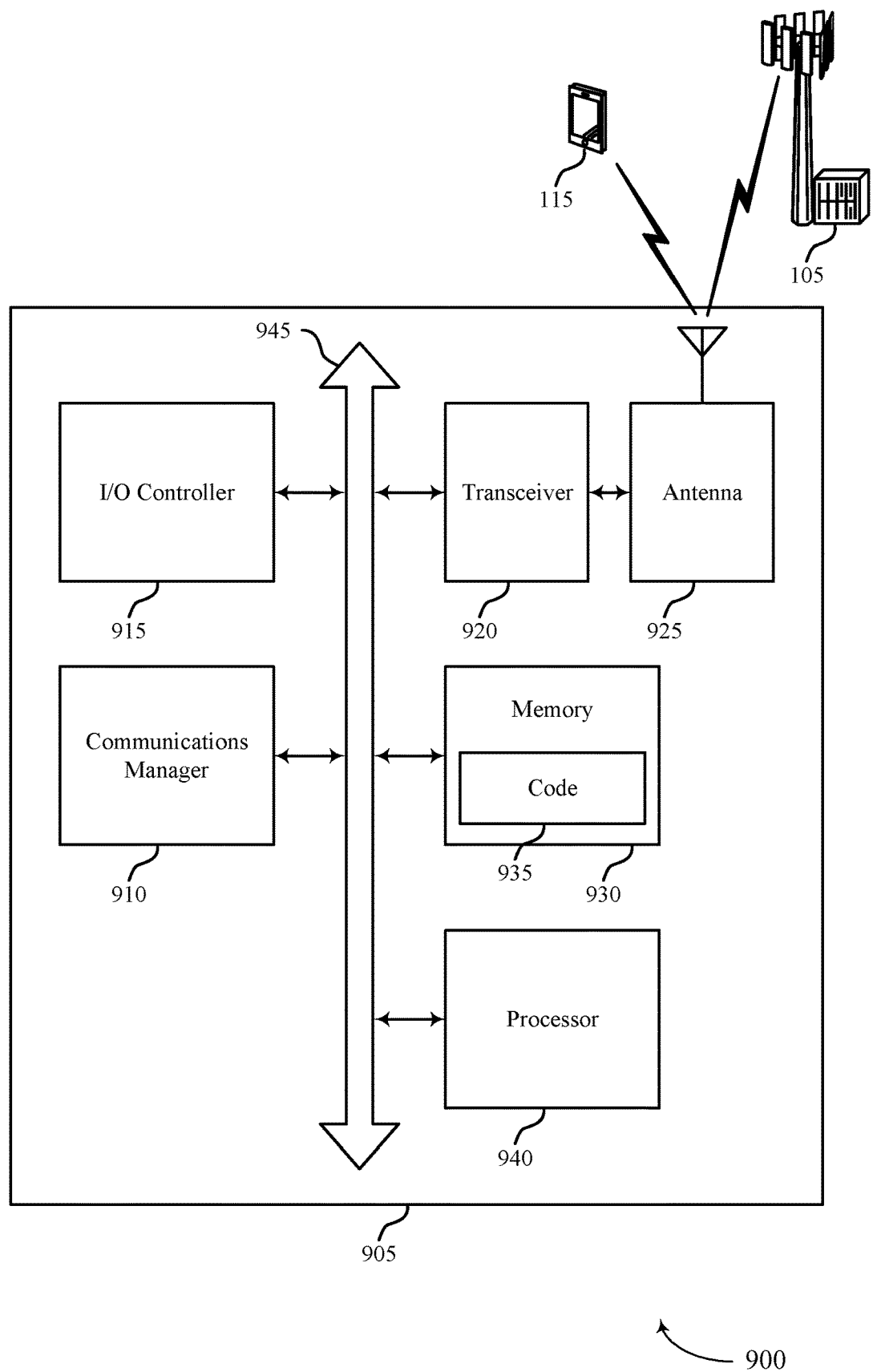
FIG. 9 shows a diagram of a system including a device that supports two-root preamble design for delay and frequency shift in accordance with aspects of the present disclosure.

FIG. 9 shows a diagram of a system 900 including a device 905 that supports two-root preamble design for delay and frequency shift in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive control signaling that indicates a set of root preamble sequences, transmit a preamble signal that is generated based on a first root preamble sequence and a second root preamble sequence of the set of root preamble sequences, and monitor for a preamble response based on the preamble signal.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting two-root preamble design for delay and frequency shift).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 of the UE 115 may transmit a preamble signal based on the generation of the preamble signal. The two-root preamble signal may be configured to efficiently indicate to a satellite 120 RTD and Doppler effect without additional overhead messaging. The efficient indication and detection of RTD and Doppler effect as enabled by processor 940 may decrease latency and allow for improved communications reliability between a UE 115 and a satellite 120 in an NTN. Processor 940 may also signal other components to pre-compensate further transmissions to a satellite 120, which may decrease the impact of RTD and Doppler effect on the reception quality and reliability of the transmitted signal.

Figure 10:
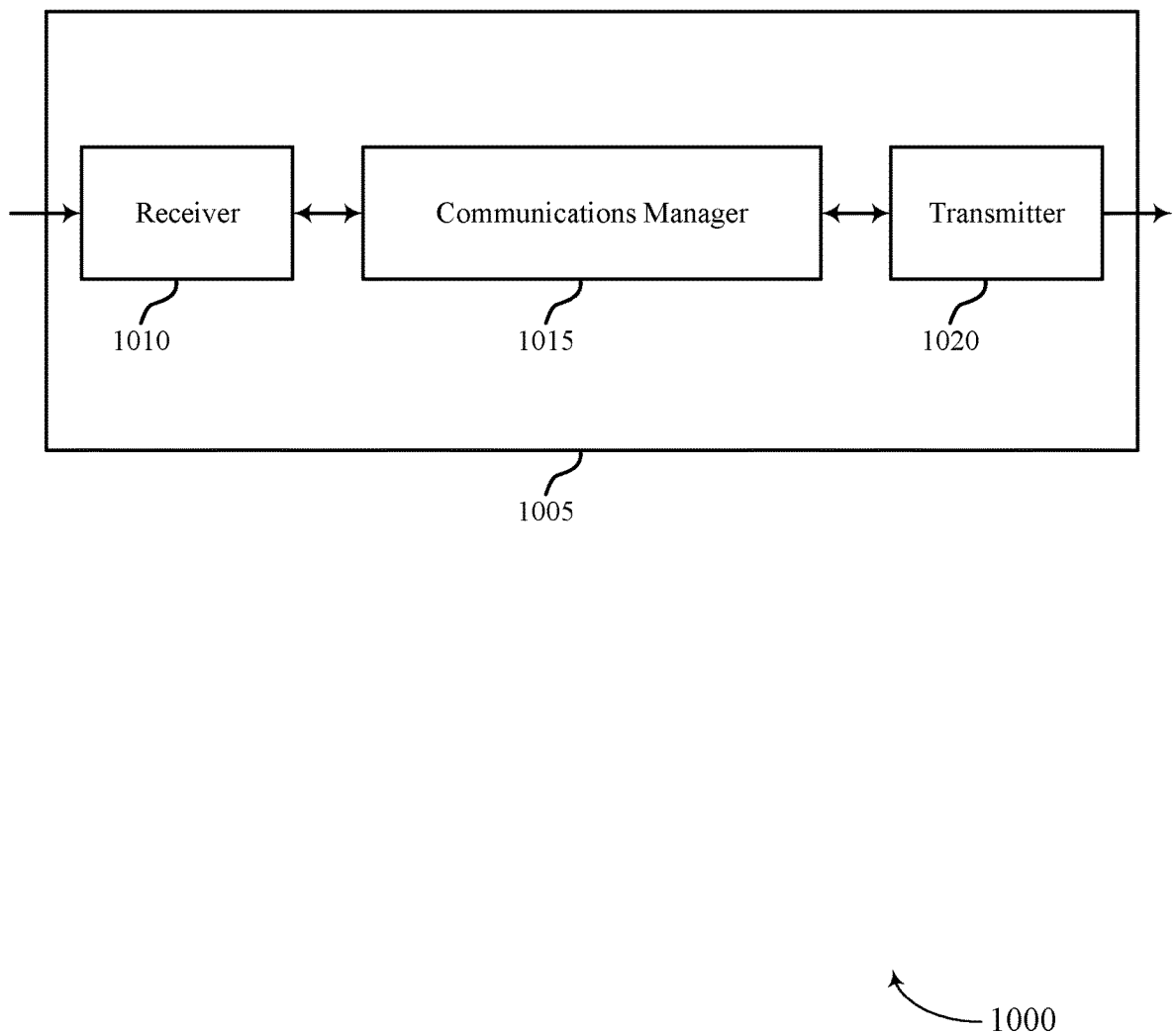
FIGS. 10 and 11 show block diagrams of devices that support two-root preamble design for delay and frequency shift in accordance with aspects of the present disclosure.

FIG. 10 shows a block diagram 1000 of a device 1005 that supports two-root preamble design for delay and frequency shift in accordance with aspects of the present disclosure. The device 1005 may be an example of aspects of a satellite 120 or a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to two-root preamble design for delay and frequency shift, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit control signaling that indicates a set of root preamble sequences, receive a preamble signal that is generated based on a first root preamble sequence and a second root preamble sequence of the set of root preamble sequences, and transmit a preamble response based on the preamble signal. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
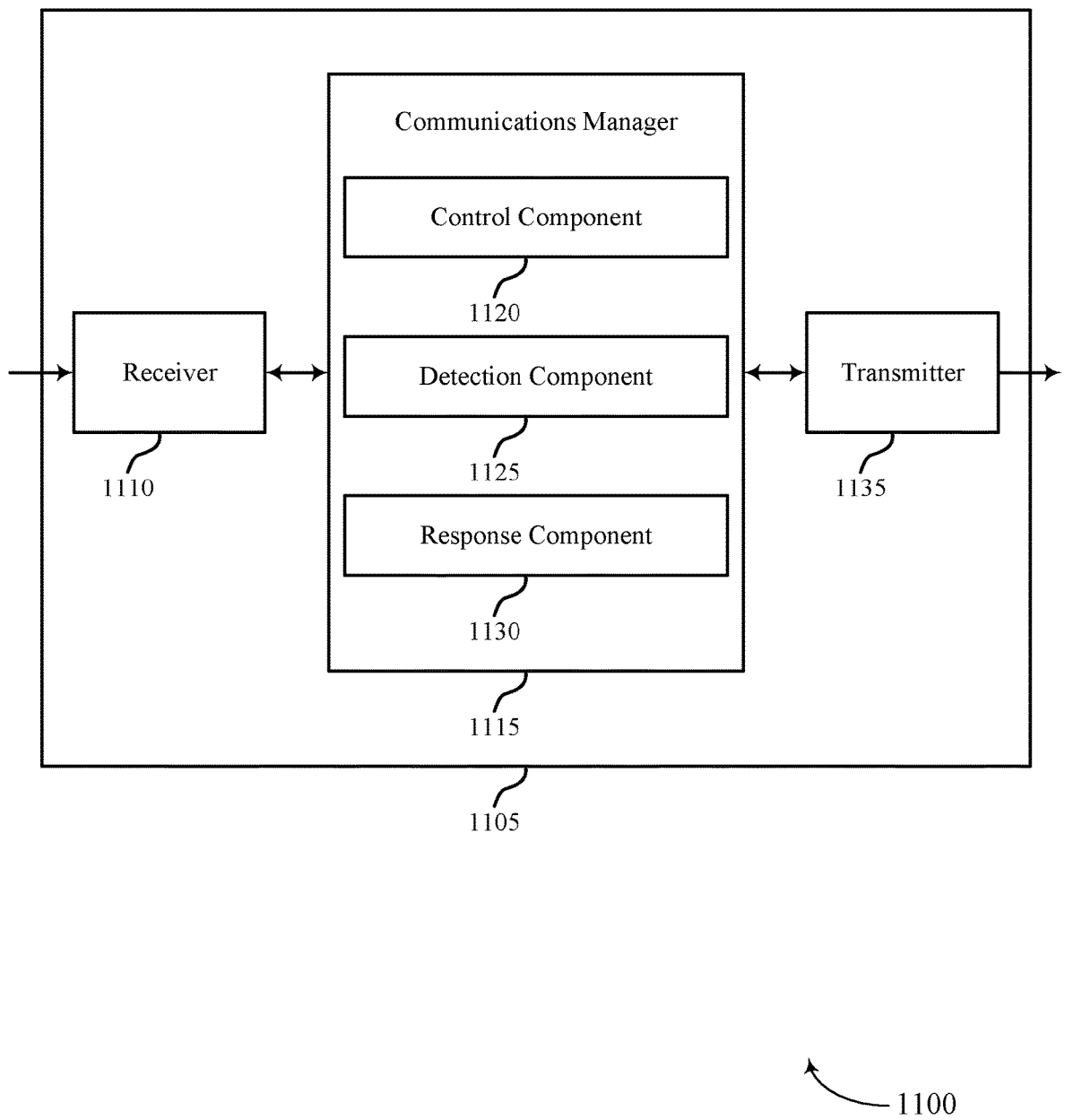

FIG. 11 shows a block diagram 1100 of a device 1105 that supports two-root preamble design for delay and frequency shift in accordance with aspects of the present disclosure. The device 1105 may be an example of aspects of a device 1005, or a satellite 120 or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to two-root preamble design for delay and frequency shift, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a control component 1120, a detection component 1125, and a response component 1130. The communications manager 1115 may be an example of aspects of the communications manager 1310 described herein.

The control component 1120 may transmit control signaling that indicates a set of root preamble sequences. The detection component 1125 may receive a preamble signal that is generated based on a first root preamble sequence and a second root preamble sequence of the set of root preamble sequences. The response component 1130 may transmit a preamble response based on the preamble signal.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
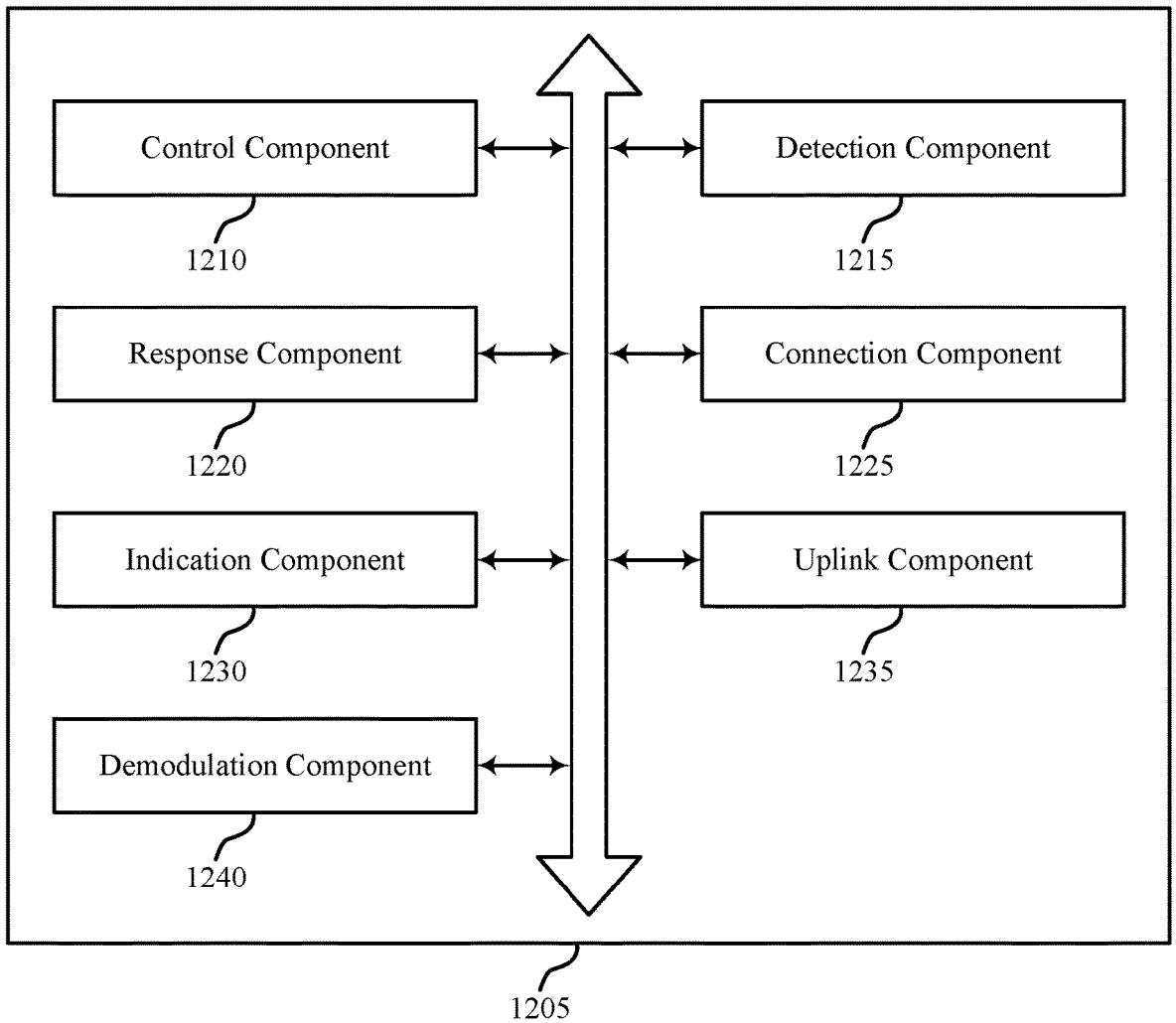
FIG. 12 shows a block diagram of a communications manager that supports two-root preamble design for delay and frequency shift in accordance with aspects of the present disclosure.

FIG. 12 shows a block diagram 1200 of a communications manager 1205 that supports two-root preamble design for delay and frequency shift in accordance with aspects of the present disclosure. The communications manager 1205 may be an example of aspects of a communications manager 1015, a communications manager 1115, or a communications manager 1310 described herein. The communications manager 1205 may include a control component 1210, a detection component 1215, a response component 1220, a connection component 1225, an indication component 1230, an uplink component 1235, and a demodulation component 1240. Each of these modules may communicate, directly or indirectly, with one another (e.g., via one or more buses).

The control component 1210 may transmit control signaling that indicates a set of root preamble sequences. The detection component 1215 may receive a preamble signal that is generated based on a first root preamble sequence and a second root preamble sequence of the set of root preamble sequences. In some examples, the detection component 1215 may receive the preamble signal over two symbol periods that are sequential in time. In some examples, the detection component 1215 may receive a first preamble signal that generated based on the first root preamble sequence during a first symbol period.

In some examples, the detection component 1215 may receive a second preamble signal that generated based on the second root preamble sequence during a second symbol period that is sequential in time to the first symbol period. In some examples, the detection component 1215 may perform a first correlation of a first signal received during the first symbol period with each of the set of root preamble sequences to identify the first root preamble sequence. In some examples, the detection component 1215 may perform a second correlation of a second signal received during the second symbol period with each of the set of root preamble sequences to identify the second root preamble sequence. In some examples, the detection component 1215 may identify a doppler shift, a delay, or both, based on the first correlation, the second correlation, or both.

In some examples, receiving the preamble signal that is generated based on a first root preamble sequence pair that includes the first root preamble sequence and the second root preamble sequence. In some examples, the detection component 1215 may receive, in a first frequency resource, a first preamble signal. In some examples, the detection component 1215 may receive, in a second frequency resource, a second preamble signal.

In some cases, the first and second preamble signals are transmitted during a single symbol period. In some cases, a guard time satisfies a round trip delay threshold. In some cases, a length of each of the first root preamble sequence and of the second root preamble sequence satisfies a cyclic prefix length threshold. In some cases, each of the first root preamble sequence and the second root preamble sequence is a Zadoff-Chu sequence. In some cases, the wireless device is a terrestrial base station or a satellite.

The response component 1220 may transmit a preamble response based on the preamble signal. The connection component 1225 may establish connectivity with a user equipment based on the preamble response. The indication component 1230 may transmit a doppler indicator, a delay indicator, or both, based on the preamble signal. The uplink component 1235 may receive a data transmission, a control transmission, or both, using a waveform that is pre-compensated based on the doppler indicator, the delay indicator, or both. The demodulation component 1240 may demodulate a data transmission, a control transmission, or both, based on the doppler indicator, the delay indicator, or both.

Figure 13:
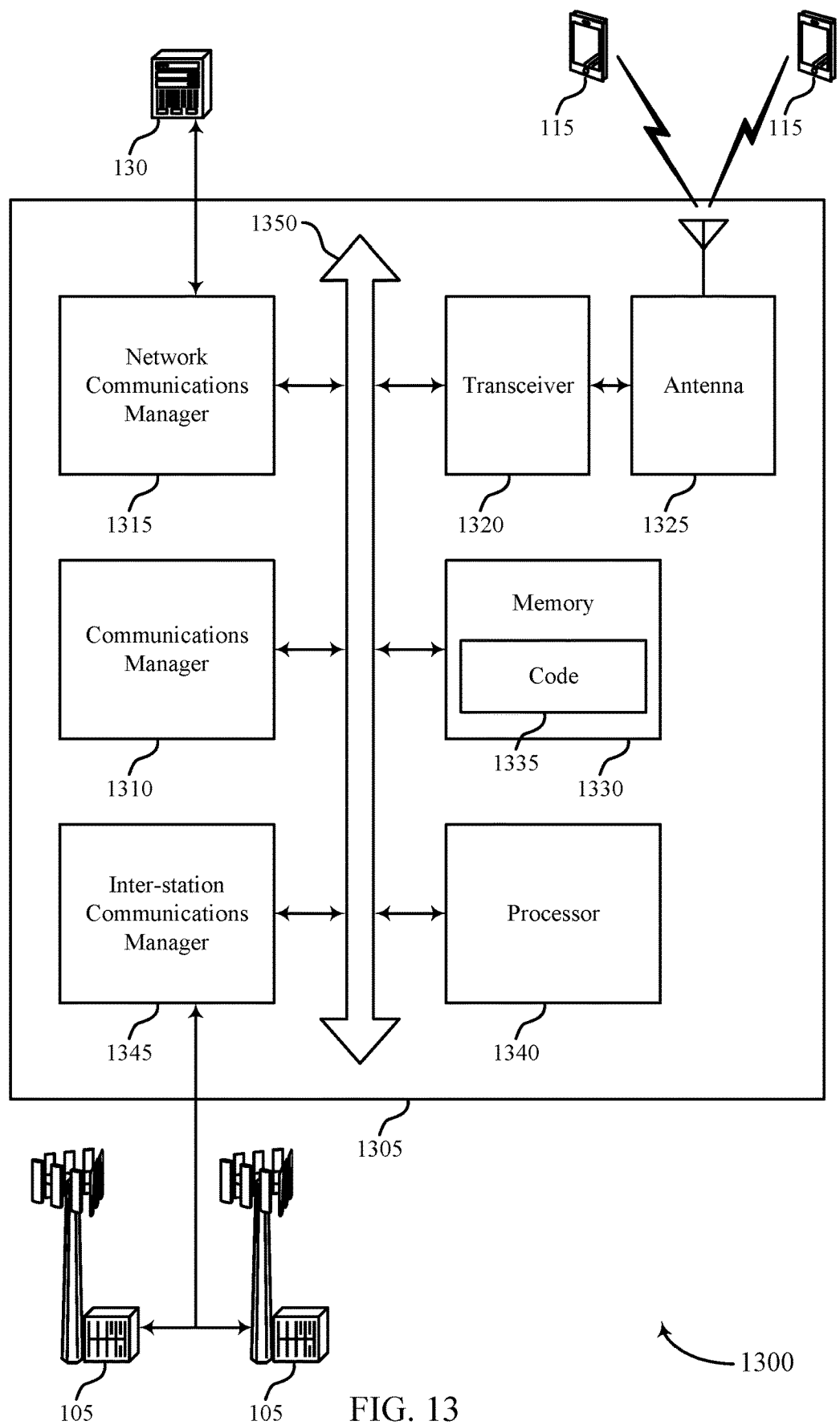
FIG. 13 shows a diagram of a system including a device that supports two-root preamble design for delay and frequency shift in accordance with aspects of the present disclosure.

FIG. 13 shows a diagram of a system 1300 including a device 1305 that supports two-root preamble design for delay and frequency shift in accordance with aspects of the present disclosure. The device 1305 may be an example of or include the components of device 1005, device 1105, or a satellite 120 or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit control signaling that indicates a set of root preamble sequences, receive a preamble signal that is generated based on a first root preamble sequence and a second root preamble sequence of the set of root preamble sequences, and transmit a preamble response based on the preamble signal.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting two-root preamble design for delay and frequency shift).

The inter-station communications manager 1345 may manage communications with other satellites 120 or base stations 105, and may include a controller or scheduler for controlling communications with UEs 115 in cooperation with other satellites 120 or base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between satellites 120 or base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
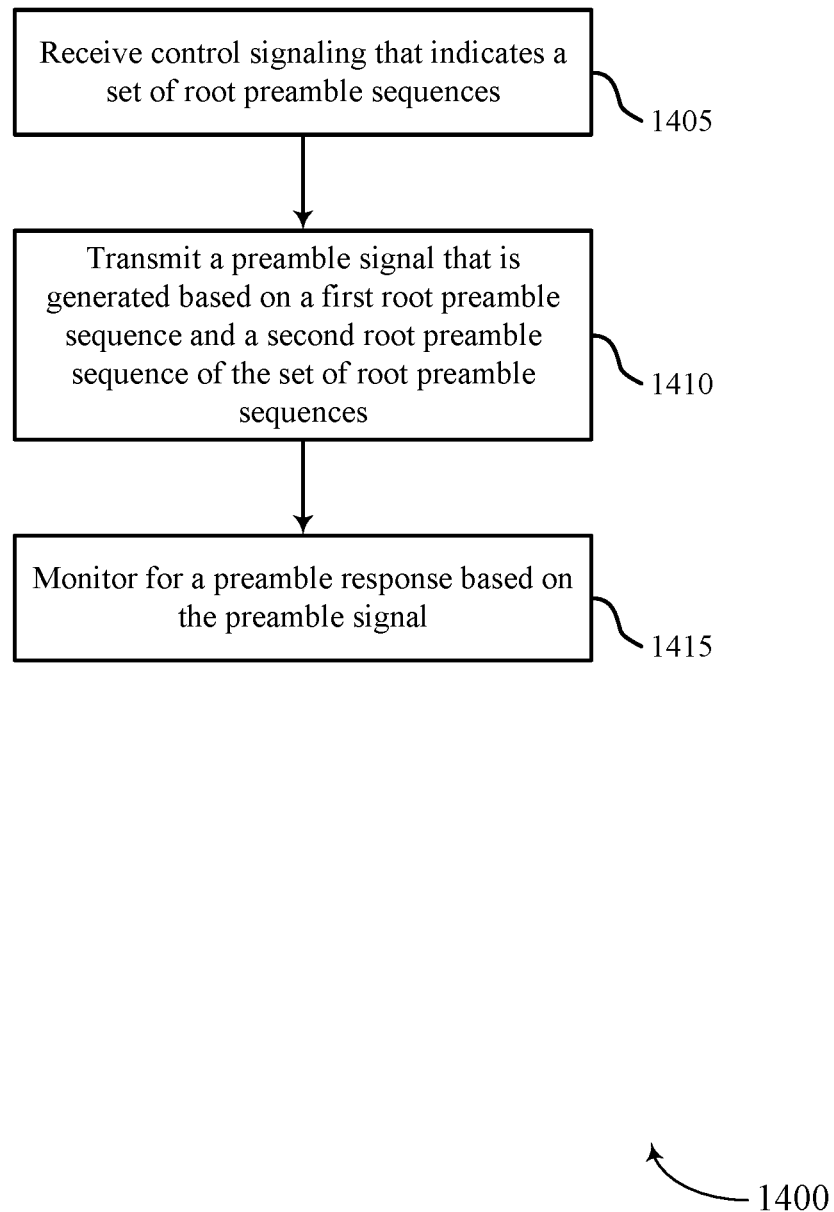
FIGS. 14 through 17 show flowcharts illustrating methods that support two-root preamble design for delay and frequency shift in accordance with aspects of the present disclosure.

FIG. 14 shows a flowchart illustrating a method 1400 that supports two-root preamble design for delay and frequency shift in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive control signaling that indicates a set of root preamble sequences. The operations of 1405 may be performed according to the methods described herein. In some examples, aspects of the operations of 1405 may be performed by a control signaling component as described with reference to FIGS. 6 through 9.

At 1410, the UE may transmit a preamble signal that is generated based on a first root preamble sequence and a second root preamble sequence of the set of root preamble sequences. The operations of 1410 may be performed according to the methods described herein. In some examples, aspects of the operations of 1410 may be performed by a preamble signal generation component as described with reference to FIGS. 6 through 9.

At 1415, the UE may monitor for a preamble response based on the preamble signal. The operations of 1415 may be performed according to the methods described herein. In some examples, aspects of the operations of 1415 may be performed by a response monitor component as described with reference to FIGS. 6 through 9.

Figure 15:
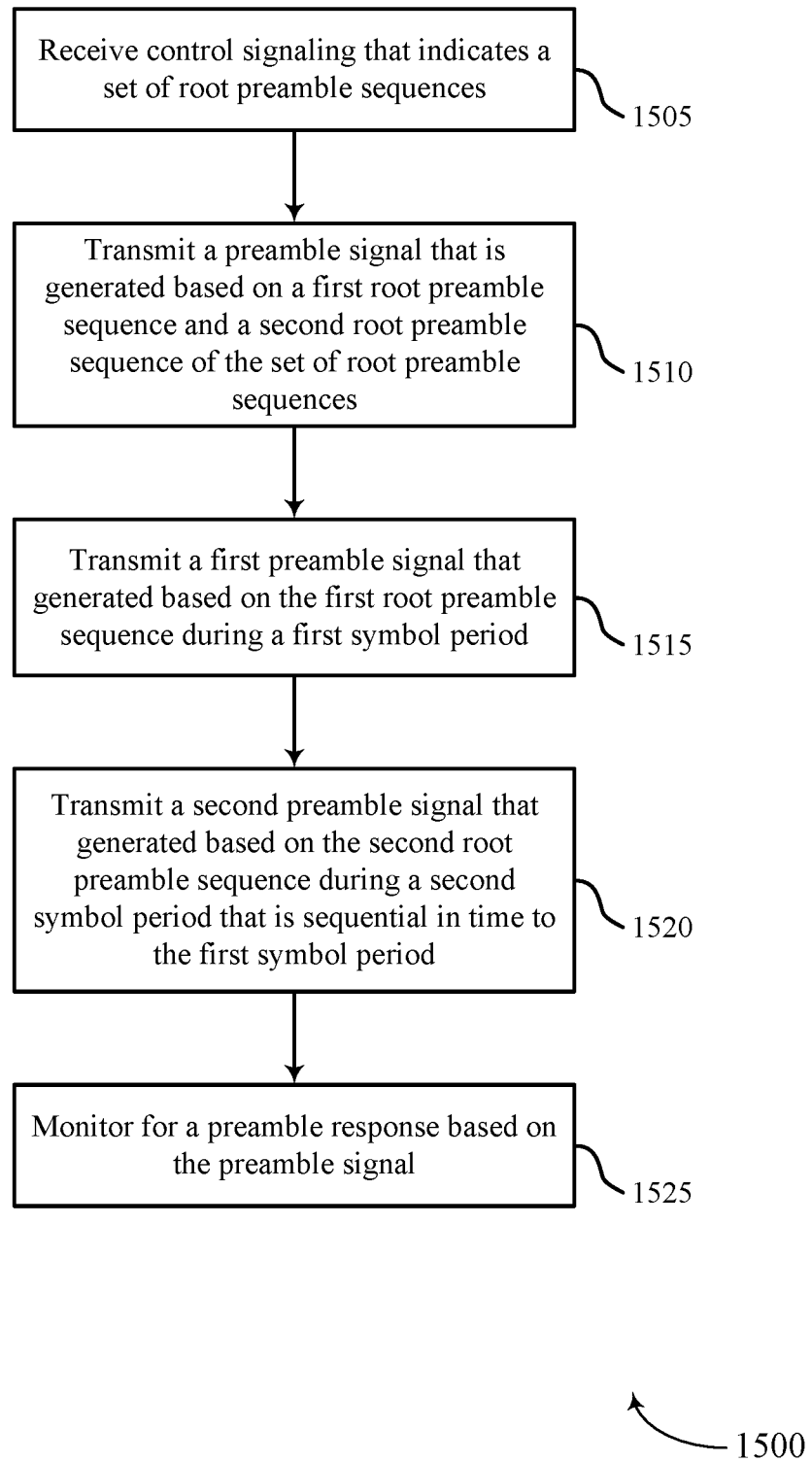

FIG. 15 shows a flowchart illustrating a method 1500 that supports two-root preamble design for delay and frequency shift in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive control signaling that indicates a set of root preamble sequences. The operations of 1505 may be performed according to the methods described herein. In some examples, aspects of the operations of 1505 may be performed by a control signaling component as described with reference to FIGS. 6 through 9.

At 1510, the UE may transmit a preamble signal that is generated based on a first root preamble sequence and a second root preamble sequence of the set of root preamble sequences. The operations of 1510 may be performed according to the methods described herein. In some examples, aspects of the operations of 1510 may be performed by a preamble signal generation component as described with reference to FIGS. 6 through 9.

At 1515, the UE may transmit a first preamble signal that generated based on the first root preamble sequence during a first symbol period. The operations of 1515 may be performed according to the methods described herein. In some examples, aspects of the operations of 1515 may be performed by a preamble signal generation component as described with reference to FIGS. 6 through 9.

At 1520, the UE may transmit a second preamble signal that generated based on the second root preamble sequence during a second symbol period that is sequential in time to the first symbol period. The operations of 1520 may be performed according to the methods described herein. In some examples, aspects of the operations of 1520 may be performed by a preamble signal generation component as described with reference to FIGS. 6 through 9.

At 1525, the UE may monitor for a preamble response based on the preamble signal. The operations of 1525 may be performed according to the methods described herein. In some examples, aspects of the operations of 1525 may be performed by a response monitor component as described with reference to FIGS. 6 through 9.

Figure 16:
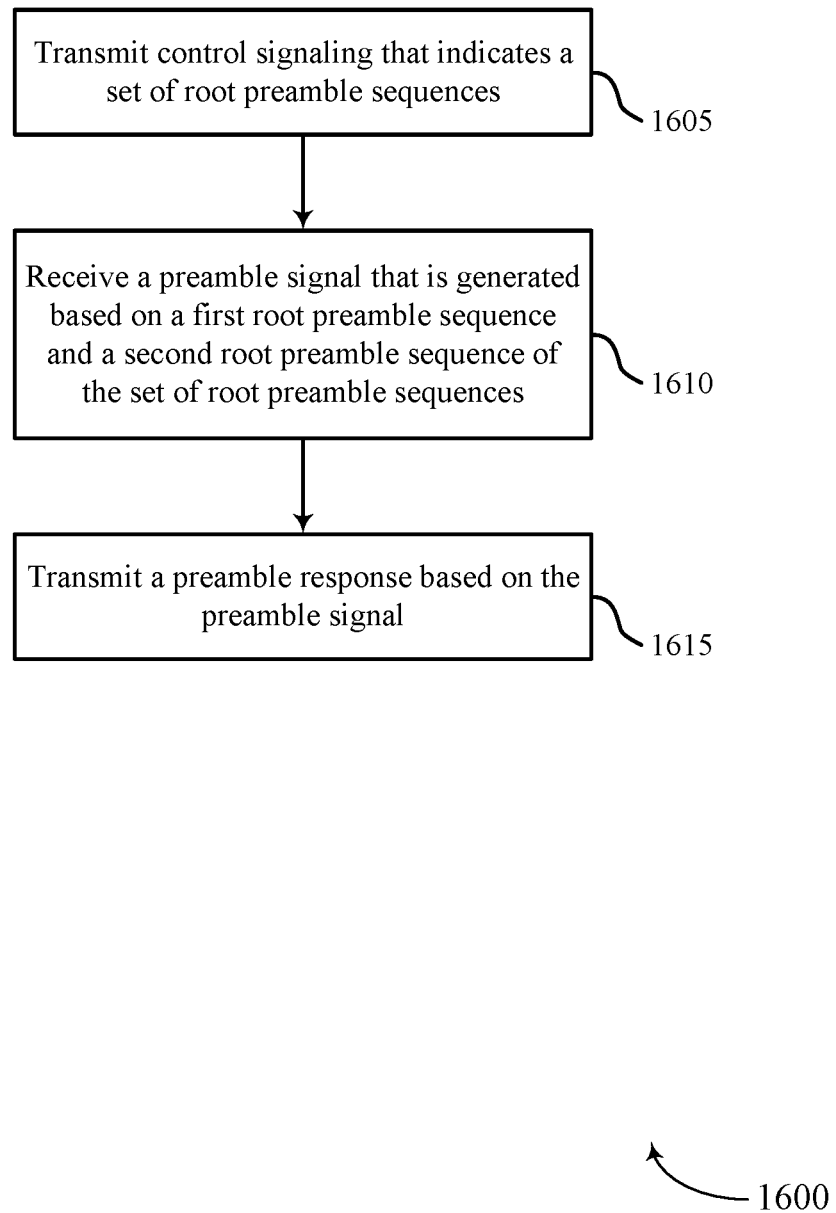

FIG. 16 shows a flowchart illustrating a method 1600 that supports two-root preamble design for delay and frequency shift in accordance with aspects of the present disclosure. The operations of method 1600 may be implemented by a satellite 120 or base station 105 or its components as described herein. For example, the operations of method 1600 may be performed by a communications manager as described with reference to FIGS. 10 through 13. In some examples, a satellite or base station may execute a set of instructions to control the functional elements of the base station to perform the functions described herein. Additionally or alternatively, a satellite or a base station may perform aspects of the functions described herein using special-purpose hardware.

At 1605, the satellite or base station may transmit control signaling that indicates a set of root preamble sequences. The operations of 1605 may be performed according to the methods described herein. In some examples, aspects of the operations of 1605 may be performed by a control component as described with reference to FIGS. 10 through 13.

At 1610, the satellite or base station may receive a preamble signal that is generated based on a first root preamble sequence and a second root preamble sequence of the set of root preamble sequences. The operations of 1610 may be performed according to the methods described herein. In some examples, aspects of the operations of 1610 may be performed by a detection component as described with reference to FIGS. 10 through 13.

At 1615, the satellite or base station may transmit a preamble response based on the preamble signal. The operations of 1615 may be performed according to the methods described herein. In some examples, aspects of the operations of 1615 may be performed by a response component as described with reference to FIGS. 10 through 13.

Figure 17:
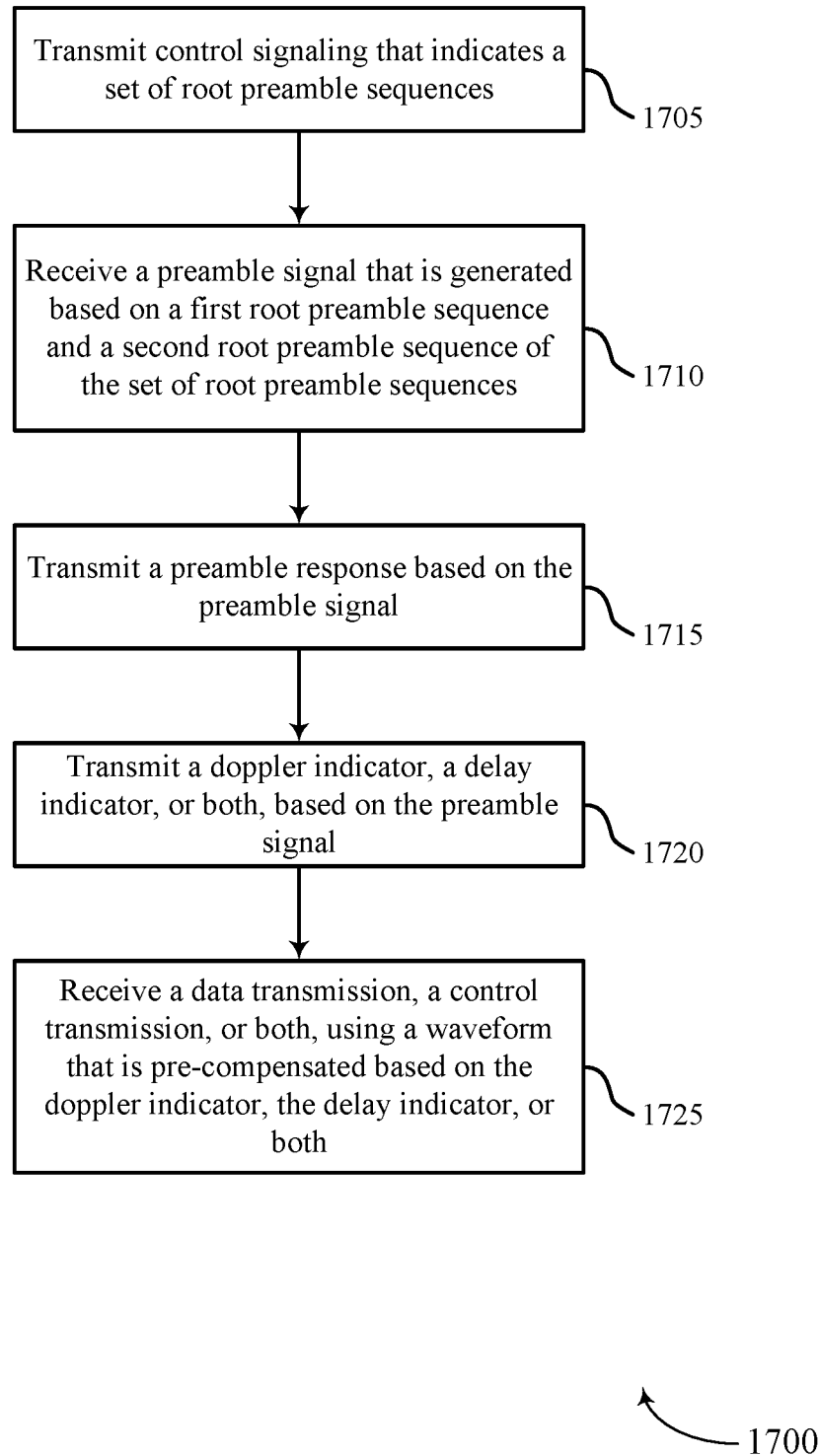

FIG. 17 shows a flowchart illustrating a method 1700 that supports two-root preamble design for delay and frequency shift in accordance with aspects of the present disclosure. The operations of method 1700 may be implemented by a satellite 120 or base station 105 or its components as described herein. For example, the operations of method 1700 may be performed by a communications manager as described with reference to FIGS. 10 through 13. In some examples, a satellite or base station may execute a set of instructions to control the functional elements of the satellite or base station to perform the functions described herein. Additionally or alternatively, a satellite or base station may perform aspects of the functions described herein using special-purpose hardware.

At 1705, the satellite or base station may transmit control signaling that indicates a set of root preamble sequences. The operations of 1705 may be performed according to the methods described herein. In some examples, aspects of the operations of 1705 may be performed by a control component as described with reference to FIGS. 10 through 13.

At 1710, the satellite or base station may receive a preamble signal that is generated based on a first root preamble sequence and a second root preamble sequence of the set of root preamble sequences. The operations of 1710 may be performed according to the methods described herein. In some examples, aspects of the operations of 1710 may be performed by a detection component as described with reference to FIGS. 10 through 13.

At 1715, the satellite or base station may transmit a preamble response based on the preamble signal. The operations of 1715 may be performed according to the methods described herein. In some examples, aspects of the operations of 1715 may be performed by a response component as described with reference to FIGS. 10 through 13.

At 1720, the satellite or base station may transmit a doppler indicator, a delay indicator, or both, based on the preamble signal. The operations of 1720 may be performed according to the methods described herein. In some examples, aspects of the operations of 1720 may be performed by an indication component as described with reference to FIGS. 10 through 13.

At 1725, the satellite or base station may receive a data transmission, a control transmission, or both, using a waveform that is pre-compensated based on the doppler indicator, the delay indicator, or both. The operations of 1725 may be performed according to the methods described herein. In some examples, aspects of the operations of 1725 may be performed by an uplink component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   receiving control signaling that indicates a plurality of root preamble sequences;
   transmitting a two-root preamble signal over two symbol periods that are sequential in time, wherein the two-root preamble signal is generated based at least in part on a first root preamble sequence and a second root preamble sequence of the plurality of root preamble sequences, and wherein the first root preamble sequence is different than the second root preamble sequence; and
   monitoring for a preamble response based at least in part on the two-root preamble signal.

2. The method of claim 1, wherein the first root preamble sequence is a first Zadoff-Chu root sequence that is different than the second root preamble sequence that is a second Zadoff-Chu root sequence.

3. The method of claim 1, wherein transmitting the two-root preamble signal comprises:
transmitting a first preamble signal that is generated based at least in part on the first root preamble sequence during a first symbol period; and
transmitting a second preamble signal that is generated based at least in part on the second root preamble sequence during a second symbol period that is sequential in time to the first symbol period.

4. The method of claim 1, wherein monitoring for the preamble response comprises:
transmitting a second two-root preamble signal based at least in part on determining that the preamble response has not been received.

5. The method of claim 1, wherein monitoring for the preamble response comprises:
receiving the preamble response from a base station; and
establishing connectivity with the base station based at least in part on the preamble response.

6. The method of claim 1, wherein transmitting the two-root preamble signal comprises:
transmitting the two-root preamble signal that is generated based at least in part on a first root preamble sequence pair that comprises the first root preamble sequence and the second root preamble sequence.

7. The method of claim 6, further comprising:
generating a plurality of preamble sequence pairs based at least in part on the plurality of root preamble sequences, wherein each first tuple of each preamble sequence pair of the plurality of preamble sequence pairs is unique and each second tuple in each preamble sequence pair of the plurality of preamble sequence pairs is unique.

8. The method of claim 6, further comprising:
generating a plurality of preamble sequence pairs based at least in part on the plurality of root preamble sequences, wherein each first tuple of each preamble sequence pair of the plurality of preamble sequence pairs is unique or each second tuple in each preamble sequence pair of the plurality of preamble sequence pairs is unique.

9. The method of claim 1, further comprising:
receiving a doppler indicator, a delay indicator, or both, based at least in part on the two-root preamble signal; and
transmitting a data transmission, a control transmission, or both, using a waveform that is pre-compensated based at least in part on the doppler indicator, the delay indicator, or both.

10. The method of claim 1, further comprising:
appending a first cyclic prefix to the first root preamble sequence and a second cyclic prefix to the second root preamble sequence to generate a combined root preamble sequence, wherein the two-root preamble signal is generated based at least in part on the combined root preamble sequence.

11. The method of claim 1, further comprising:
appending a first cyclic prefix to the first root preamble sequence to generate a first appended preamble sequence and a second cyclic prefix to the second root preamble sequence to generate a second appended preamble sequence.

12. The method of claim 11, wherein transmitting the two-root preamble signal comprises:
transmitting, in a first frequency resource, a first preamble signal that is generated based at least in part on the first appended preamble sequence; and
transmitting, in a second frequency resource, a second preamble signal that is generated based at least in part on the second appended preamble sequence.

13. The method of claim 12, wherein the first and second preamble signals are transmitted during a single symbol period.

14. The method of claim 1, wherein a guard time satisfies a round trip delay threshold.

15. The method of claim 1, wherein a length of each of the first root preamble sequence and of the second root preamble sequence satisfies a cyclic prefix length threshold.

16. The method of claim 1, wherein the control signaling and the preamble response are received from a satellite, and the two-root preamble signal is transmitted to the satellite.

17. A method for wireless communications by a wireless device, comprising:
transmitting control signaling that indicates a plurality of root preamble sequences;
receiving a two-root preamble signal over two symbol periods that are sequential in time, wherein the two-root preamble signal is generated based at least in part on a first root preamble sequence and a second root preamble sequence of the plurality of root preamble sequences, and wherein the first root preamble sequence is different than the second root preamble sequence; and
transmitting a preamble response based at least in part on the two-root preamble signal.

18. The method of claim 17, wherein the first root preamble sequence is a first Zadoff-Chu root sequence that is different than the second root preamble sequence that is a second Zadoff-Chu root sequence.

19. The method of claim 17, wherein receiving the two-root preamble signal comprises:
receiving a first preamble signal that generated based at least in part on the first root preamble sequence during a first symbol period; and
receiving a second preamble signal that generated based at least in part on the second root preamble sequence during a second symbol period that is sequential in time to the first symbol period.

20. The method of claim 19, wherein receiving the first preamble signal comprises:
performing a first correlation of a first signal received during the first symbol period with each of the plurality of root preamble sequences to identify the first root preamble sequence;
performing a second correlation of a second signal received during the second symbol period with each of the plurality of root preamble sequences to identify the second root preamble sequence; and
identifying a doppler shift, a delay, or both, based at least in part on the first correlation, the second correlation, or both.

21. The method of claim 17, further comprising:
establishing connectivity with a user equipment based at least in part on the preamble response.

22. The method of claim 17, wherein receiving the two-root preamble signal comprises:
receiving the two-root preamble signal that is generated based at least in part on a first root preamble sequence pair that comprises the first root preamble sequence and the second root preamble sequence.

23. The method of claim 17, further comprising:
transmitting a doppler indicator, a delay indicator, or both, based at least in part on the two-root preamble signal; and
receiving a data transmission, a control transmission, or both, using a waveform that is pre-compensated based at least in part on the doppler indicator, the delay indicator, or both.

24. The method of claim 17, further comprising:
transmitting a doppler indicator, a delay indicator, or both, based at least in part on the two-root preamble signal; and
demodulating a data transmission, a control transmission, or both, based at least in part on the doppler indicator, the delay indicator, or both.

25. The method of claim 17, wherein receiving the two-root preamble signal comprises:
receiving, in a first frequency resource, a first preamble signal; and
receiving, in a second frequency resource, a second preamble signal.

26. The method of claim 25, wherein the first and second preamble signals are transmitted during a single symbol period.

27. The method of claim 17, wherein a length of each of the first root preamble sequence and of the second root preamble sequence satisfies a cyclic prefix length threshold.

28. The method of claim 17, wherein the wireless device is a satellite, and wherein the control signaling and the preamble response are transmitted to a user equipment (UE), and the two-root preamble signal is received from the UE.

29. An apparatus for wireless communications by a user equipment (UE), comprising: a processor, memory coupled with the processor; and instructions stored in the memory and executable by the processor to cause the apparatus to:
receive control signaling that indicates a plurality of root preamble sequences;
transmit a two-root preamble signal over two symbol periods that are sequential in time, wherein the two-root preamble signal that is generated based at least in part on a first root preamble sequence and a second root preamble sequence of the plurality of root preamble sequences, and wherein the first root preamble sequence is different than the second root preamble sequence; and
monitor for a preamble response based at least in part on the two-root preamble signal.

30. An apparatus for wireless communications by a wireless device, comprising: a processor, memory coupled with the processor; and instructions stored in the memory and executable by the processor to cause the apparatus to:
transmit control signaling that indicates a plurality of root preamble sequences;
receive a two-root preamble signal over two symbol periods that are sequential in time, wherein the two-root preamble signal is generated based at least in part on a first root preamble sequence and a second root preamble sequence of the plurality of root preamble sequences, and wherein the first root preamble sequence is different than the second root preamble sequence; and
transmit a preamble response based at least in part on the two-root preamble signal.

* * * * *